United States Patent [19]

Miller

[11] Patent Number: 5,511,067
[45] Date of Patent: Apr. 23, 1996

[54] LAYERED CHANNEL ELEMENT IN A BASE STATION MODEM FOR A CDMA CELLULAR COMMUNICATION SYSTEM

[75] Inventor: David S. Miller, Escondido, Calif.

[73] Assignee: Qualcomm Incorporated, San Diego, Calif.

[21] Appl. No.: 261,539

[22] Filed: Jun. 17, 1994

[51] Int. Cl.⁶ ............................ H04B 7/216; H04J 13/00; H04Q 7/00
[52] U.S. Cl. .................... 370/18; 370/95.1; 370/110.1; 379/63
[58] Field of Search ................... 370/18, 95.1, 95.3, 370/110.1; 375/205; 379/59, 60, 63; 455/33.1, 33.2, 54.1, 56.1

[56] References Cited

U.S. PATENT DOCUMENTS

| | | | |
|---|---|---|---|
| 4,817,089 | 3/1989 | Paneth et al. | 370/95 |
| 5,103,459 | 4/1992 | Gilhousen et al. | 375/1 |
| 5,121,391 | 6/1992 | Paneth et al. | 370/95.1 |
| 5,208,804 | 5/1993 | Wilson et al. | 370/30 |
| 5,218,618 | 6/1993 | Sagey | 379/59 |
| 5,249,218 | 9/1993 | Sainton | 379/59 |
| 5,257,397 | 10/1993 | Barzegar et al. | 455/33.1 |
| 5,365,590 | 11/1994 | Brame | 370/95.3 |

FOREIGN PATENT DOCUMENTS 2174274  10/1989  United Kingdom .......... H04L 27/20

*Primary Examiner*—Hassan Kizou
*Attorney, Agent, or Firm*—Russell B. Miller

[57] ABSTRACT

The invention provides a layered channel software element which supervises the operation of channel element modem resources in a CDMA cellular telephone system that includes forward channels for conveying message and signalling data from a CDMA system base station to mobile units and reverse channels for conveying message and signalling data from mobile units to base stations. Each channel is implemented in a channel element including a general purpose processor and a modem application-specific integrated circuit ASIC. The layered channel software element executes on the general processor. The layered channel software element provides a structure and function for transferring message and signalling data between the telecommunication system and the modem ASIC and also for establishing channel operations by providing channel configuration information to the modem ASIC.

34 Claims, 19 Drawing Sheets

LAYERED CHANNEL ELEMENT IN A BASE STATION MODEM FOR A CDMA CELLULAR COMMUNICATION SYSTEM

BACKGROUND OF THE INVENTION

1. Field of the Invention

This invention relates generally to a spread spectrum telecommunications system and, more particularly, to a channel element modem in a CDMA cellular communication system.

2. Description of the Related Art

To serve a large number of telecommunication users over a limited electro-magnetic spectrum, one of a variety of multiple access techniques may be used. These techniques include, for example, time division multiple access (TDMA), frequency division multiple access (FDMA), and code division multiple access (CDMA). The CDMA technique has many advantages over the other techniques, and an exemplary CDMA system is described in U.S. Pat. No. 4,901,307 issued Feb. 13, 1990, assigned to the assignee of this invention, and incorporated herein by reference.

In the CDMA cellular system described in the '307 patent, a large number of mobile telephone system users, each having a transceiver, communicates through satellite repeaters or terrestrial stations which are also referred to as cells. Each cell includes a physical plant called a base station. A cell covers a limited geographic area and routes calls carried over cellular telephones to and from a telecommunication network such as a public switched telephone network (PSTN). When a cellular telephone user moves into the geographic area of a new cell, the routing of that user's call may be eventually made through the new cell by a process called "handing off".

A cellular telephone or, more specifically, a mobile unit, broadcasts a signal that is received by a cell and then is routed to the PSTN and to telephone lines or other mobile units. A cell broadcasts a cell signal that is received by mobile units. The cell-to-mobile signal transmission path is generally referred to as the "forward link" and the mobile-to-cell transmission path is generally referred to as the "reverse link".

The CDMA technique permits a frequency spectrum to be effectively used multiple times within a time interval, thus increasing system user capacity. The CDMA technique described in the '307 patent makes use of high-frequency pseudo-noise (PN) code modulation of individual calls, as well as modulation by codes including orthogonal binary sequences, to combine many calls and broadcast them as a single CDMA signal. In this way, the CDMA technique permits discrimination between many calls that occupy the same frequency band and provides increased spectral efficiency as compared with other techniques.

A system and method for CDMA telephone system communications is described in U.S. Pat. No. 5,103,459, issued Apr. 7, 1992 and in U.S. Pat. No. 5,267,261, issued Nov. 30, 1993, both assigned to the assignee of the present invention, and both incorporated herein by reference. These patents both disclose base station architecture and operation. The following co-pending U.S. Patent Applications, assigned to the assignee of this application, describe modulator-demodulator (MODEM) architectures that implement a complete CDMA base band modem that performs reverse link demodulation and forward link modulation:

1. U.S. patent application Ser. No. 08/316,156, filed Sep. 30, 1994, for "SERIAL LINKED INTERCONNECT FOR SUMMATION OF MULTIPLE WAVEFORMS ON A COMMON CHANNEL", inventors K. Easton et al.;

2. U.S. patent application Ser. No. 08/316,177, filed Sep. 30, 1994, for "MULTIPATH SEARCH PROCESSOR FOR A MULTIPLE ACCESS COMMUNICATION SYSTEM", inventors K. Easton et al.;

3. U.S. patent application Ser. No. 08/372,632, filed Jan. 13, 1995, for "CELL SITE DEMODULATOR ARCHITECTURE FOR A SPREAD SPECTRUM MULTIPLE ACCESS COMMUNICATION SYSTEM", inventors K. Easton et al.; and 4. U.S. patent application Ser. No. 08/492,592, filed Jan. 20, 1995, for "MOBILE DEMODULATOR ARCHITECTURE FOR A SPREAD SPECTRUM MULTIPLE ACCESS COMMUNICATION SYSTEM", inventors K. Easton et al.

The main thrust for development of the physical modem architecture described in detail in these co-pending applications has been to provide reduction in component count and cost. Assuming implementation of a base station modem architecture in a single application specific integrated circuit (ASIC), there is a concurrent need for an accompanying processing component that supports the physical implementation of modem functions in ASIC.

At the heart of a CDMA system is a physical layer embracing a number of forward and reverse CDMA channels. In this regard, a forward CDMA channel is a channel from a base station to mobile stations and includes one or more code channels. Code channels are subchannels of forward CDMA channels that are assigned for specific purposes and distinguished by orthogonal coding. A reverse CDMA channel is a code channel from a mobile station to a base station. Preferably, a channel element in a CDMA base station is a subsystem comprising hardware and software that supports one forward and one reverse code channel. Each channel element of a plurality of channel elements in a base station includes a modem ASIC, and a channel element software program to implement control of the physical structure's channel operations.

SUMMARY OF THE INVENTION

The invention resides in a layered channel software element which supervises the operation of channel element physical resources in order to fully implement a channel element. The layered channel software element (hereinafter, "the layered element") executes on a channel processor.

Preferably, a layered element would provide an architecture and platform-independent implementation of channel element physical resource supervision. In this regard, the layered software element would be generic and transportable between various combinations of network architectures and channel element processors.

In the description which follows, a portion of the layered element is presented as an architecture and platform-independent implementation that controls the operation of the physical resources of a channel element.

Preferably, a layered element according to the invention acts on instructions to provide high level physical layer services. Relatedly, the layered element has the capability of supporting all required channel element functionality.

Benefits and advantages of the present invention will become apparent from the following description of the preferred embodiment when it is considered with reference to the drawings.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
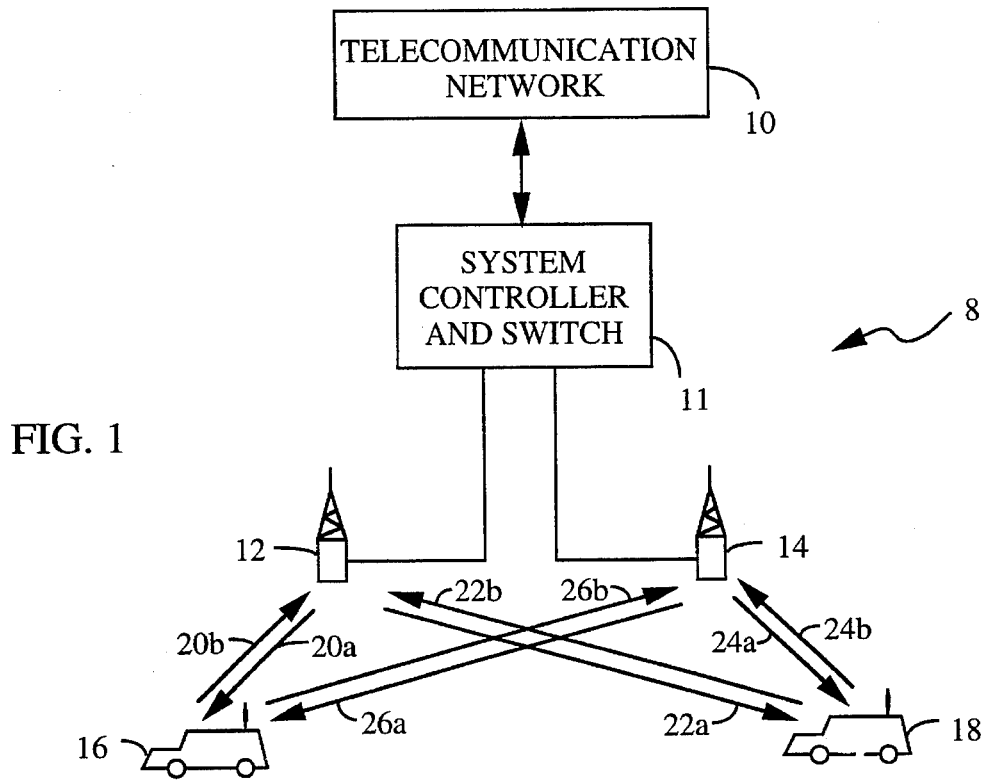
FIG. 1 is a block diagram presenting a schematic overview of an exemplary CDMA cellular telephone system in accordance with the present invention.

In a CDMA cellular communication system, each base station has a plurality of modulator-demodulator apparatuses (modems) for spread-spectrum modulation and demodulation of message and signaling data. Each modem includes a digital spread spectrum transmit modulator, at least one digital spread spectrum data receiver, and a searcher receiver. Each modem at a base station is assigned to a mobile unit as needed to facilitate communications with the assigned unit. Consequently, many modems are available for use at any base station, while other modems may be active in communicating with respective mobile units.

In order to provide service to a plurality of mobile units, communications from the standpoint of a base station are separated into discrete channels. In this application, a set of channels transmitted from, and received by, a base station on a given frequency is referred to collectively as a CDMA channel. A forward CDMA channel is a channel from a base station to mobile units. A forward CDMA channel comprises one or more code channels that are transmitted on the CDMA frequency with reference to a particular pilot signal. For example, code channels may include a pilot channel, a synchronization (sync) channel, paging channels, and traffic channels. The forward CDMA channel typically includes a pilot channel, one sync channel, one or more paging channels, and one or more traffic channels. In the preferred embodiment, the total number of code channels, including the pilot channel, is no greater than 64. A CDMA channel from a mobile unit to a base station is called a reverse CDMA channel. For any base station, the reverse CDMA channel is the sum of all mobile unit transmissions received by the base station on the CDMA frequency.

The pilot channel is used by a base station to transmit an unmodulated, direct-sequence spread spectrum pilot signal that is spread by a pseudo-random noise (PN) spreading code common typically, but not necessary common to the PN spreading of the other transmitted signal. The pilot signal continuously transmitted by the base station is used by mobile units to obtain initial system timing, serve as a phase reference for coherent modulation, and a signal strength reference for comparisons between base station pilot signals to support hand off.

Preferably, the pilot signal transmitted by each base station has the same PN spreading code, but a code phase offset different than the offsets of all other base stations. Phase offset allows the pilot signals to be distinguished one from another by mobile units, thereby providing a means for the mobile units to differentiate between base stations.

Each base station also transmits a sync channel signal comprising a modulated, encoded, interleaved, direct sequence, spread spectrum signal used by mobile units to acquire additional synchronization, system time, and overhead control information. Each base station sync channel consists of a sync message with a fixed format, having a predetermined timing relationship with the base station's pilot signal and a predetermined channel code. The message includes system identification, network identification, pilot PN sequence offset index, a public long PN code mask for public use in paging and access channels, system time parameters, and a paging channel data rate.

The set of forward channels transmitted by a base station also includes one or more paging channels that carry paging channel signals. Paging channel signals are modulated, interleaved, scrambled, direct sequence, spread spectrum signals which contain control and overhead information. A paging channel is used to communicate forward link signaling data to mobile units. The public long PN code mask portion of the sync and paging channels is used by a mobile unit to descramble the paging channel scrambled signal. Like the sync channel signals, the paging channel signals are spread and despread using the same short PN code and offset as the pilot channel.

The base station forward channels include a plurality of traffic channels. Each mobile unit is assigned to a unique traffic channel for receiving message data intended for the mobile unit. Each traffic channel signal is a modulated, interleaved, scrambled, direct sequence, spread spectrum signal transmitted to a mobile unit on a respective traffic channel signified by a long spreading code. Information received in the sync channel message is used by a mobile unit to descramble traffic channel signals.

Reverse CDMA channels include access channels that are used by mobile units for communicating with a base station. An access channel is used for short signaling message exchanges including reverse signaling data, responses to pages, and registrations. A reverse CDMA traffic channel is used to transmit reverse message data from a mobile unit to a base station.

An exemplary illustration of a CDMA cellular telephone system is illustrated in FIG. 1. The CDMA cellular telephone system is indicated generally by 8 and includes a system controller and switch 11 also referred to as a mobile telephone switching office (MTSO), that includes interface and processing circuitry for providing system control to the base stations. The controller 11 also routes telephone calls from a telecommunications network 10 to the appropriate base station for transmission to the appropriate mobile unit. The controller 11 also controls the routing of calls from the mobile units via one or more base stations to the telecommunication network. The controller 11 may direct calls between mobile units via the appropriate base stations. The controller 11 may be coupled to the base stations by various conventional means.

In FIG. 1, two exemplary base stations, 12 and 14, along with exemplary mobile units 16 and 18, each including a cellular telephone, are illustrated. Arrows 20a and 20b represent forward and reverse code channels that define a possible communication link between the base station 12 and the mobile unit 16. Arrows 22a and 22b define a possible communication link between the base station 12 and the mobile unit 18. Similarly, the base station 14 can establish a two-way communication link with the mobile unit 18 as represented by the arrows 24a and 24b and with the mobile unit 16 as represented by the arrows 26a and 26b.

Initially, a mobile unit selects and acquires a base station, based upon the relative strength of pilot signals that it receives. The mobile unit locks on to the strongest pilot signal whereby it acquires the pilot channel of the transmitting base station. Given the predetermined timing offset between a pilot signal and a sync signal and the known sync channel code, the mobile unit next obtains system configuration and timing information by way of the sync message transmitted in the sync channel of the base station whose pilot channel the mobile unit has acquired. Upon synchronizing its timing to that of the base station whose pilot channel it has acquired, the mobile unit idles, monitoring a designated paging channel of the base station whose pilot channel it has acquired.

In the idle state, a mobile unit can, among other things, receive an incoming call or initiate a call. In the idle state, a mobile unit locks to the paging channel identified by the sync message transmitted by the base station whose pilot channel the mobile unit has acquired. Assuming an incoming call from the telecommunication network 10 for mobile unit 16, the system controller and switch 11 sends an incoming call message to all base stations including the base stations 12 and 14. The incoming call message comprises signaling data that includes a unique identification number (IN) identifying a mobile unit. All base stations prepare paging messages including the signaling data and send it out on a paging channel. The mobile unit identified by the IN, monitoring the paging channel of a base station, receives and decodes the page message from the paging channel, detects its own IN, and sends a page response on an access channel for that base station. The page response includes the mobile unit's unique identification and the base station identification. This enables the base station to accept responsibility for connecting the call to the mobile unit. This is done by assigning a traffic channel in a paging channel message following receipt of the mobile unit's access channel message. The traffic channel is indicated by a channel code contained in the paging channel message. The designated traffic channel is provided for forward and reverse message data which may comprise, for example, voice data in the call.

A mobile unit initiates a call by providing signaling data on an access channel to a base station whose pilot channel it has acquired, receiving a traffic channel assignment from the identified base station on the paging channel, and conducting the call over the designated traffic channel.

Figure 2:
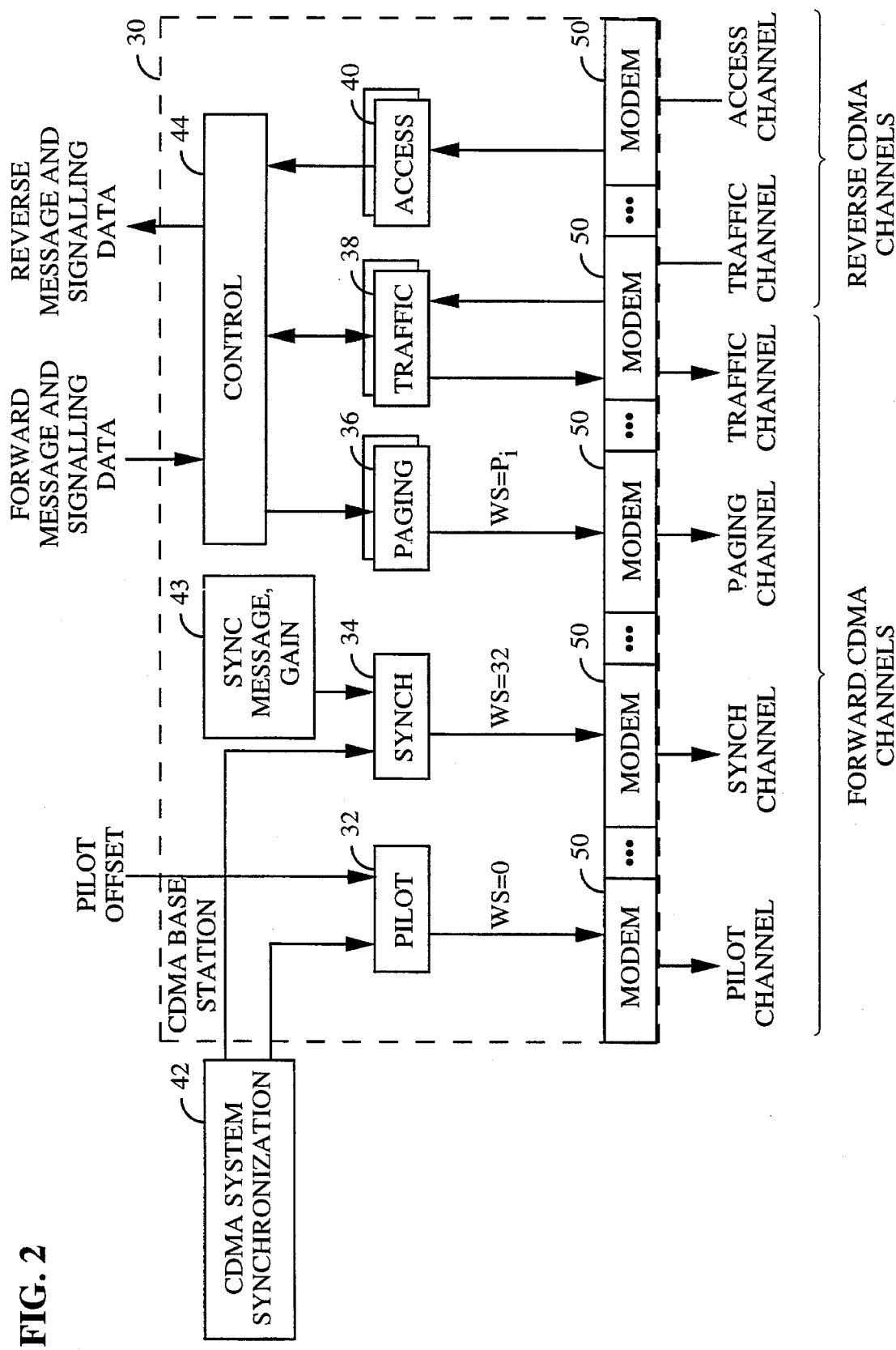
FIG. 2 is a functional block diagram illustrating forward and reverse CDMA channels in a CDMA base station.

The channel architecture of a base station 30 is illustrated in FIG. 2. In FIG. 2, the base station 30 operates a CDMA channel including at least 5 code channels that include a pilot channel, a sync channel, one or more paging channels, one or more traffic channels, and one or more access channels. Redundant channel elements at the base station provide the physical and functional means to send information in multiple forward code channels and to receive information in multiple reverse code channels. Each channel element includes a control element and a modem. Preferably, the modems are identical as is indicated by use of a single reference numeral 50 to indicate each modem. Thus, the pilot channel includes a pilot control element 32 and modem 50, the sync channel includes a sync control element 34 and a modem 50, each paging channel includes a paging control element 36 and a modem 50, each traffic channel includes a traffic control element 38 and modem 50, while each access channel includes an access channel control element 40 and a modem 50. Each traffic channel which is assigned for message data traffic includes a forward traffic code channel and a reverse traffic code channel to support two-way communications between a mobile unit and another unit. The pilot and sync channels are synchronized to system time by a CDMA system synchronization element 42, which can comprise, for example, a GPS receiver that provides a point from which the pilot signal generation can be offset. The pilot offset is received from the system controller (reference 11 in FIG. 1). A sync channel message and a gain setting are provided by a message source 43. The overall control and switching mechanization for the CDMA system has a local control component in each CDMA base station for interfacing forward message and signaling data that is to be provided on forward paging and traffic channels and reverse message and signaling data that is received on reverse traffic and access channels. In the base station 30, this element is indicated by reference numeral 44.

Preferably, the subcomponents of the forward and reverse CDMA channels are designated by predetermined orthogonal code sequences generated by using Walsh functions. These sequences are referred to as Walsh sequences (WS). As is amply laid out in the incorporated patents, the pilot channel uses the Walsh all zero sequence. This is signified in FIG. 2 by WS=0. In this manner, predetermined Walsh sequences are assigned to sync channel (WS=32), to the paging channels (WS=$P_i$), and to the access channels. A plurality of sequences is available for traffic channel assignments.

Figure 3:
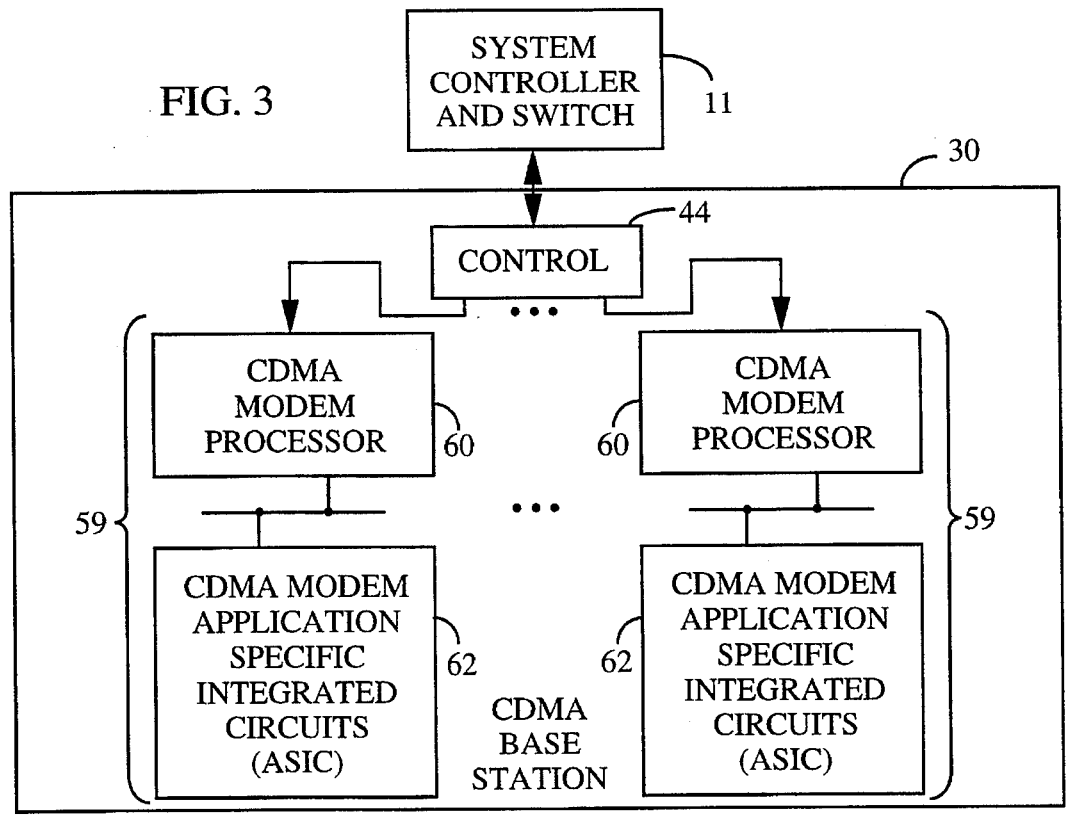
FIG. 3 is a block diagram illustrating the physical implementation of the channel architecture illustrated in FIG. 2.

FIG. 3 shows the physical structure of modems in the CDMA base station 30. These modems are identical and they, and their constituent parts, are referred to by identical reference numbers. Each modem 59 includes a general purpose CDMA modem processor 60 in which a layered channel software element executes, and a CDMA modem application specific integrated circuit (ASIC) 62. The CDMA modem ASICs 62 of FIG. 3 correspond essentially with the modems 50 illustrated in FIG. 2. Each CDMA modem processor 60 is coupled to the CDMA base station's system controller 44.

Figure 4A:
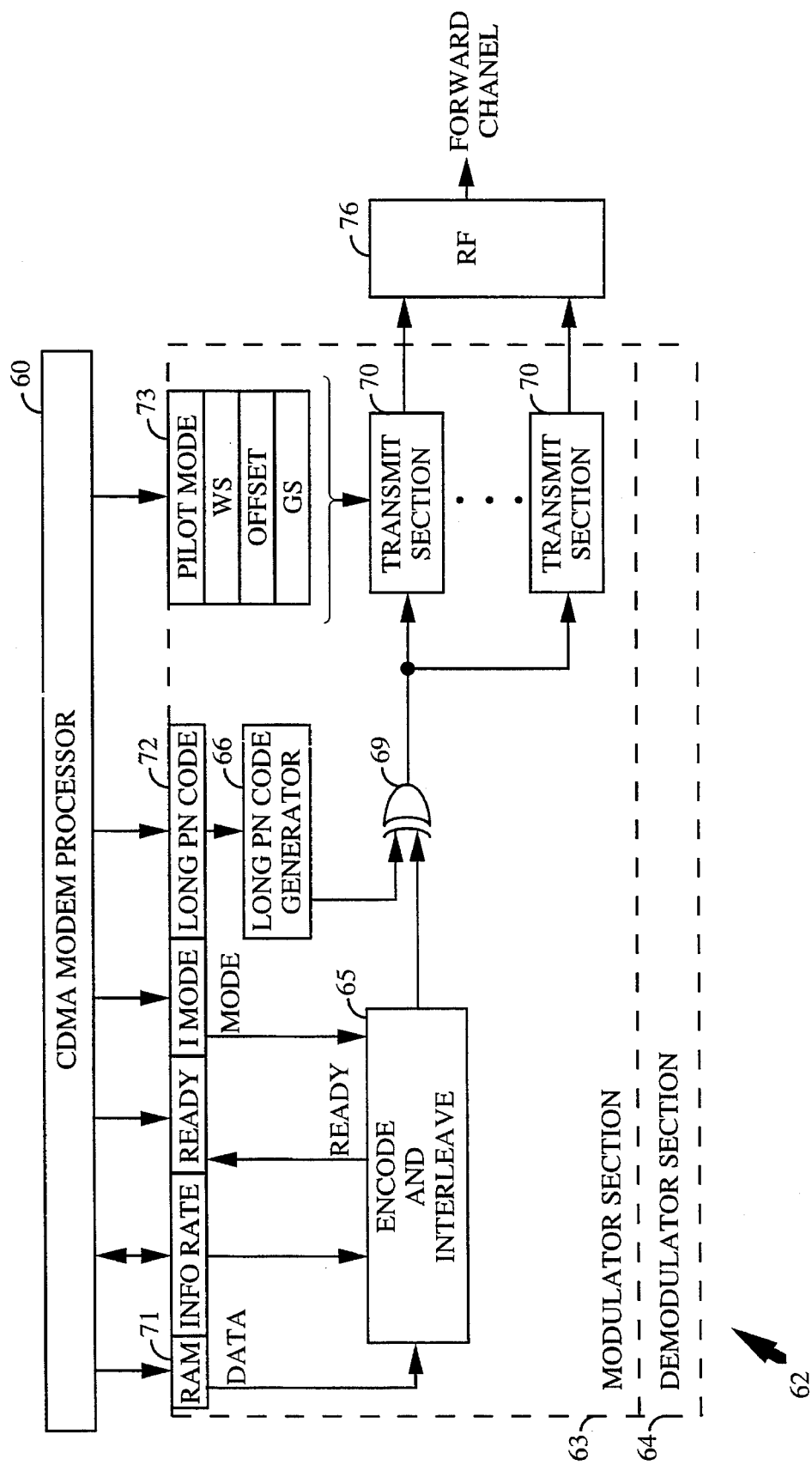
FIG. 4A is a block diagram showing a representative modulator section of a CDMA modem ASIC.
Figure 4B:
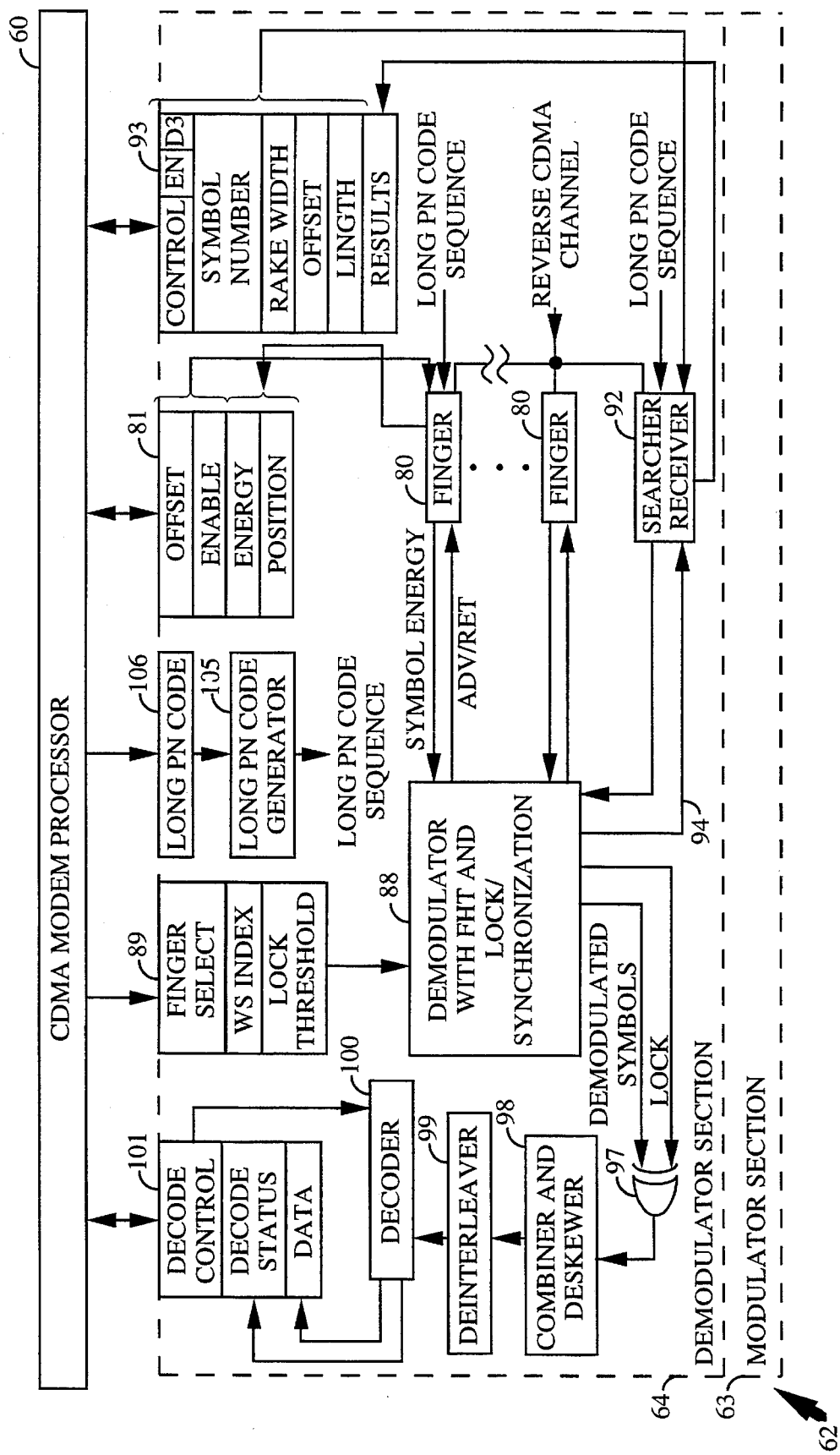
FIG. 4B is a block diagram showing a representative demodulator section of a CDMA modem ASIC.

Refer now to FIGS. 4A and 4B for an understanding of the modulator and demodulator sections, respectively, of the modem ASICs 62 of FIG. 3. Each modem ASIC 62 comprises a modulator section 63 according to FIG. 4A and a demodulator section 64 according to FIG. 4B. The modulator section shown in FIG. 4A includes three modulator transmit sections that generate forward channel information data streams. When transmitting sync, paging, or forward traffic data streams, a transmit section generates an encoded, interleaved, bit stream generated from input data including signaling and message data. For forward traffic channel operation, the encoded, interleaved bit stream is scrambled by a long code pseudo-random (PN) bit sequence. The modulator of FIG. 4A is capable of forming three forward link information bit streams corresponding to three identical transmit sections. As will be explained, each information bit stream is contained in a forward code channel which may be a pilot, sync, paging, or traffic channel.

Data to be transmitted in a sync, paging, or traffic channel is provided to an encode and interleave circuit 65. The encode and interleave circuit 65 includes a convolutional encoder that encodes sync, paging, or transmit packetized data frames provided by a CDMA modem processor into a stream of encoded symbols. The data rate may vary from frame to frame. The current frame data rate is indicated by a DATA RATE value. The circuit 65 also includes a block interleaver to provide time diversity in transmitted symbols to protect against relatively long transmission fades and burst errors. Two modes of interleaver operation are provided: a first mode is for traffic channels and paging channels, and a second mode is for sync channels. The mode is determined by the state of a mode bit denoted in FIG. 4A as IMODE. If the current packetized, encoded, interleaved data frame is for a paging or traffic channel, the preferred embodiment employs a unique long PN code that is provided to a long code generator 66 for generation of a unique long PN code sequence that scrambles the output of the encode and interleave circuit 65 in an exclusive-OR circuit 69. If the encode and interleave circuit 65 is currently providing a packetized data frame of a sync message, the long PN code is set to the all zero state, which effectively passes the output of the encode and interleave circuit 65 through the exclusive-OR circuit 69, unchanged.

The output of the exclusive-OR circuit 69 is fed to the input of each of three identical modulator transmit sections 70. Each of the transmit sections 70 covers the output of the exclusive-OR circuit 69 with a distinct Walsh sequence (WS). The Walsh covering guarantees orthoganality between code channels. Each transmit section 70 provides, after Walsh covering, QPSK spreading via common PN sequences to form in-phase and quadrature components. After spreading, these components are band-limited by FIR filtering, multiplied by a power control gain setting (GS), and then provided to an RF section 76 for amplification and transmission to mobile units on the forward channel.

For pilot channel operation, the exclusive-OR input to a particular transmit section 70 is disabled by the state of a PILOT MODE bit and the section receives the all-zero Walsh sequence, together with the predetermined offset for the base station.

In order to control operation of the modulator section, memory and register resources provided on the CDMA modem ASIC in the modulator section 63. These include a random access memory (RAM) 71 and a register set 72 with registers for storing the DATA RATE value for the current frame, a Ready signal from the encode and interleave circuit 65, the interleaver mode (IMODE) bit to establish the state of the block interleaver, and a long PN code that receives a long PN code setting enabling the long PN code generator 66 to generate long PN code sequences for scrambling forward transmit code channel data. Three sets of identical registers are provided for the transmit sections 70. One such set of registers is indicated by reference numeral 73 and includes register space for receiving the PILOT MODE bit, an OFFSET register for the pilot offset, a Walsh sequence (WS) register, and a gain setting (GS) register. The RAM 71, the register set 72, and the register sets 73 are all accessed by the CDMA modem processor 60 to control the operation of the modulator section 63.

FIG. 4B shows in block diagram form a preferred embodiment of a demodulator section 64 of the CDMA modem ASIC 62. The demodulator section includes a plurality of identical digital data receivers 80, each of which is called a "finger". There are four fingers 80 in the demodulator section. The demodulator section also includes a searcher receiver 92. The fingers 80 and the searcher receiver 92 share a demodulator 88 that includes a fast Hadamard transform (FHT) engine which processes input Walsh symbol energy samples that are despread and unscrambled by the fingers 80. Access to the FHT engine is slotted. In this regard, the FHT engine operates at a relatively high rate with respect to the rates of finger and searcher receiver operation in order to sequentially process all current finger and searcher receiver outputs in the time required to generate the next finger and searcher receiver outputs. The output of the FHT engine is provided to a diversity combiner and deskewer 98. The output of the diversity combiner and deskewer 98 is deinterleaved at 99, decoded at 100, and provided as signaling and message data at the output of the decoder 100.

The searcher receiver 92 scans the time domain, searching for the largest multi-path peaks within a search window length anchored by an initial time offset. At the end of each search, the searcher receiver 92 provides results to a CDMA modem processor. In a first mode of operation, the search results may be used to improve demodulator performance in the face of multi-path effects in a reverse traffic channel. In a second mode of operation, the searcher receiver 92 may be employed to search for signaling data in an access channel to detect the presence of a mobile unit attempting to access the CDMA system or to acquire a reverse traffic channel. The searcher receiver 92 finds the correlation energy present at a particular offset relative to a system clock time provided by the CDMA synchronization entity 42 (shown in FIG. 2). Relatedly, the searcher receiver 92 finds the correlation energy by descrambling and uncovering energy samples on a reverse code channel over the search window length. The samples are transformed by the FHT engine and the results are accumulated in the searcher receiver 92. For multi-path searches, the correlation energy is the maximum energy found across all Walsh sequences, summed over a predetermined Walsh sequence symbol time. For preamble searches, the correlation energy is the output of the FHT engine for WS=0; for message searches the correlation energy is taken across all Walsh sequences.

Therefore, the searcher receiver 92 does not require a specified Walsh sequence to uncover the channel, but must have a long PN code sequence to descramble the channel information. When scanning an access channel, the searcher receiver 92 needs a PREAMBLE bit to distinguish between a preamble and message search mode. With the PREAMBLE bit set, the searcher receiver 92 searches for maximum energy peaks using the all zero Walsh sequence; with the bit reset, the searcher receiver 92 uses maximum energy peaks across all Walsh indices.

The searcher receiver also requires slew control information from the CDMA modem processor that include search result integration period in numbers of symbols, a search rake width value, a search offset value, and a search window length value.

Finally, the searcher receiver 92 receives a long PN code sequence for descrambling private mobile unit user information in a traffic channel and for descrambling access channel information.

The searcher receiver produces search results that are provided to the CDMA modem processor for evaluation and action.

The fingers 80 are essentially identical and operate according to the description given for the digital data receiver operation in the '459 patent. For operation, each finger 80 requires an offset to which the finger is slewed, an enabling signal, a lock energy value which sets a threshold for finger operation, and a long PN spreading code.

Each of the fingers 80 is capable of being assigned by its offset value to a specific path of a multi-path signal. The demodulator 88 includes a lock and timing circuit that keeps the time delay of each finger adjusted to match the time delay of the specific path to which it has been assigned. This is done by using an error metric that determines when a finger is sampling too early or too late and adjusts the sampling time according to predetermined time increments. Finger timing adjustment is provided by the lock and timing circuit in the form of an advance or retard signal (ADV/RET). The lock and timing circuit also includes lock detection that takes a long term average of the maximum energy from each finger and determines the magnitude of the signal received on the path to which the finger is assigned. The filtered energy from each finger is compared to the energy of different possible path hypotheses from the searcher receiver 92 and if a better path is found, a finger can be reassigned to a new path by changing its offset. In synchronization with the outputs of the fingers 80, the lock and timing circuit in the demodulator 88 provides a LOCK signal which, when set, indicates that the finger whose output is being processed by the FHT engine of the demodulator 88 is providing a signal having an energy level equaling or exceeding the finger's lock energy value. In this case, the set state of the LOCK signal passes the output of the FHT engine through the AND circuit 97 for combining and deskewing, deinterleaving, and decoding at 98, 99, and 100.

A shared long PN code sequence generator 105 generates the long PN code sequences used by the fingers 80 and the searcher receiver 92 to descramble reverse channel information. The long PN code sequence generator 105 generates sequences in response to a long PN code mask placed in a register 106 by the CDMA modem processor.

Each finger has a reserved set of registers. One such register set is indicated by 81 in FIG. 4B. The register set 81 includes enable, lock energy, and offset registers that are written to or read from by the CDMA modem processor 60. The enable register stores an ENABLE bit which, when set, enables the finger for processing and demodulation. The offset register holds the value of the timing offset that corresponds to a current specific multi-path signal. Energy position registers are provided from which the finger's current accumulated energy and offset position may be read.

The searcher receiver register set 93 includes a control register including a preamble bit (PB) which, when set to a first value makes the searcher receiver conduct a preamble search and, when set to a second value, allows the searcher receiver to operate in the message search mode. The register set 93 includes symbol number, rake width, offset, and length registers which are written to by the CDMA modem processor 60. These registers hold what may be called "search window parameters". The symbol number register contents indicate a number of Walsh symbols over which energy is to be accumulated at each offset in a search window. The rake width register controls the number of offsets of which a search window is comprised. The offset register gives an initial offset (in time) where a search is to begin. The length register is the length in time of a search window. In a search, the searcher receiver 92 operates to find symbol energy maxima in a search window defined by the search window parameters. For this purpose, the searcher receiver employs the demodulator 88, receiving search results on signal path 94. The results of searcher receiver operation are read by the CDMA modem processor from a results register in the register set 93.

The demodulator 88 has an associated set of registers 89 including a finger select register that indicates a finger whose output is to be accepted for demodulation, a Walsh sequence (WS) index register which forces the demodulator 88 to process energies associated with a Walsh index specified by this register, and a lock threshold (LOCK THRESH) register whose contents set the enabled finger's lock energy value for generation of the LOCK signal. All of these registers are written to by the CDMA modem processor 60.

The decoder 100 has a reserved set of registers 101 that include a decode control register that configures the operation of the decoder 100. Register set 101 also includes a decoder status register by which the decoder indicates that decoded data have been placed in a data register subset in the set of registers 101.

Figure 5:
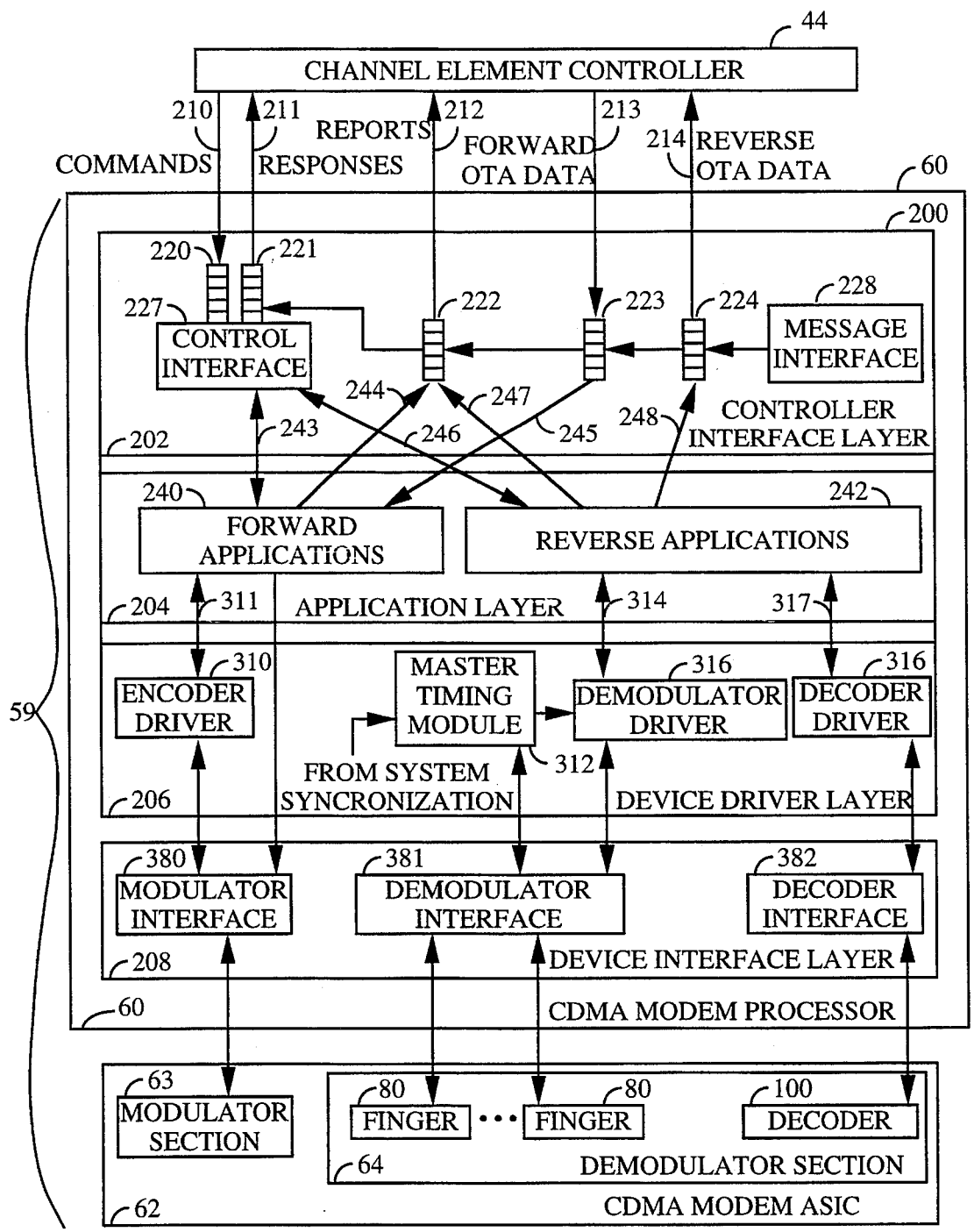
FIG. 5 is a block diagram illustrating the structural and functional partitioning of a layered element according to the invention.

FIG. 5 is a block diagram illustrating the structural and functional partitioning of a layered software element that executes in a CDMA modem processor according to the invention. The CDMA modem processor 60 is one of the CDMA modem processors shown in FIG. 3. Together with a CDMA modem ASIC 62, it forms a modem 59.

In FIG. 5, the CDMA modem processor 60 is conventional, including a CPU, memory, and an operating system providing control over the physical resources of the CDMA modem processor 60, as well as controlling the execution of programs by means of the processor physical resources. The operating system conventionally provides services that support program execution including, but not limited to, scheduling, input/output control, and resource allocation. A layered channel software element ("layered element") 200 executes on the CDMA modem processor 60. While only one layered element 200 is illustrated in FIG. 5, it is to be understood that every CDMA modem processor 60 in the base station architecture illustrated in FIG. 3 is configured identically with a layered element. Each layered element provides the functionality necessary to enable the CDMA modem processor on which it executes to control the CDMA modem ASIC to which it is connected to operate as required to perform forward or reverse code channel functions as described above.

The layered element 200 includes three layers: a controller interface layer 202, an application layer 204, and a device driver layer 206. Each layer implements a set of one or more functions. Together, the layers establish the basis for executing applications that support the operation of any of the code channels in CDMA channel operation. The layers of the layered element 200 establish a command and data pathway by means of message-based communication between the layers.

System control is implemented by means of the control element 44. The control element 44 interprets the requirements of the telecommunications network 10, translating these into standardized commands for the channel elements. The control element 44 also receives formatted forward message and signaling data from the telecommunication network 10 and provides formatted reverse message and signaling data to the network. The message and signaling data staged between the telecommunication network and modem 59 by the control element 44 may have any of a number of standard telecommunication formats, such as the well-known T1 format.

The modem 59 acts on instructions from the control element 44 to provide physical layer services such as mobile unit acquisition, forward traffic modulation, and reverse traffic demodulation.

The layered element 200 communicates with the control element 44 by packetized messages over a number of logically distinct message paths, including the message paths 210, 211, and 212. In addition, the layered element 200 receives forward message and signaling data for over the air (OTA) transmission on message path 213 and provides to the control element 44 reverse message and signaling data on message path 214.

In the description to this point, it has been assumed that the control element 44 supports multiple channel elements. In implementation, the inventor has provided linked control and layered element binary objects that execute in the same CDMA modem processor. However, because the control element 44 may be adapted as required by the system design and operation considerations, it is shown as being logically distinct from the CDMA modem processor 60 in FIG. 5; in fact, it may also be physically distinct from all base station layered elements.

The layered element 200 supports at least the following applications:

(a) pilot application, (b) sync application, (c) paging application, (d) access application, and (e) traffic application.

Under the control of the control element 44, certain applications may be executed concurrently in a layered element 200, as follows:

(a) pilot and sync applications, (b) pilot and access applications, (c) sync and access applications, (d) pilot, sync, and access applications, and (e) paging and access applications.

The control element 44 exercises control over the operation of the modem 59 by issuing command messages. The modem 59 responds to each command message by attempting to perform or to initiate commanded action, and by issuing an appropriate response.

The command/response command structure guarantees that a response is issued immediately. The inventor contemplates that, in some cases, the response will comprise only an acknowledgment that the command is valid and is being acted upon. In these cases, the control element 44 is notified of the progress of the requested function in one or more reporting messages on message path 212. This design enables the control element 44 to implement a stop-and-hold protocol with respect to the command response message paths 210, 211. Each command/response pair essentially comprises a function call where the command message is the input to the function and the response message is the output.

Figure 6A:
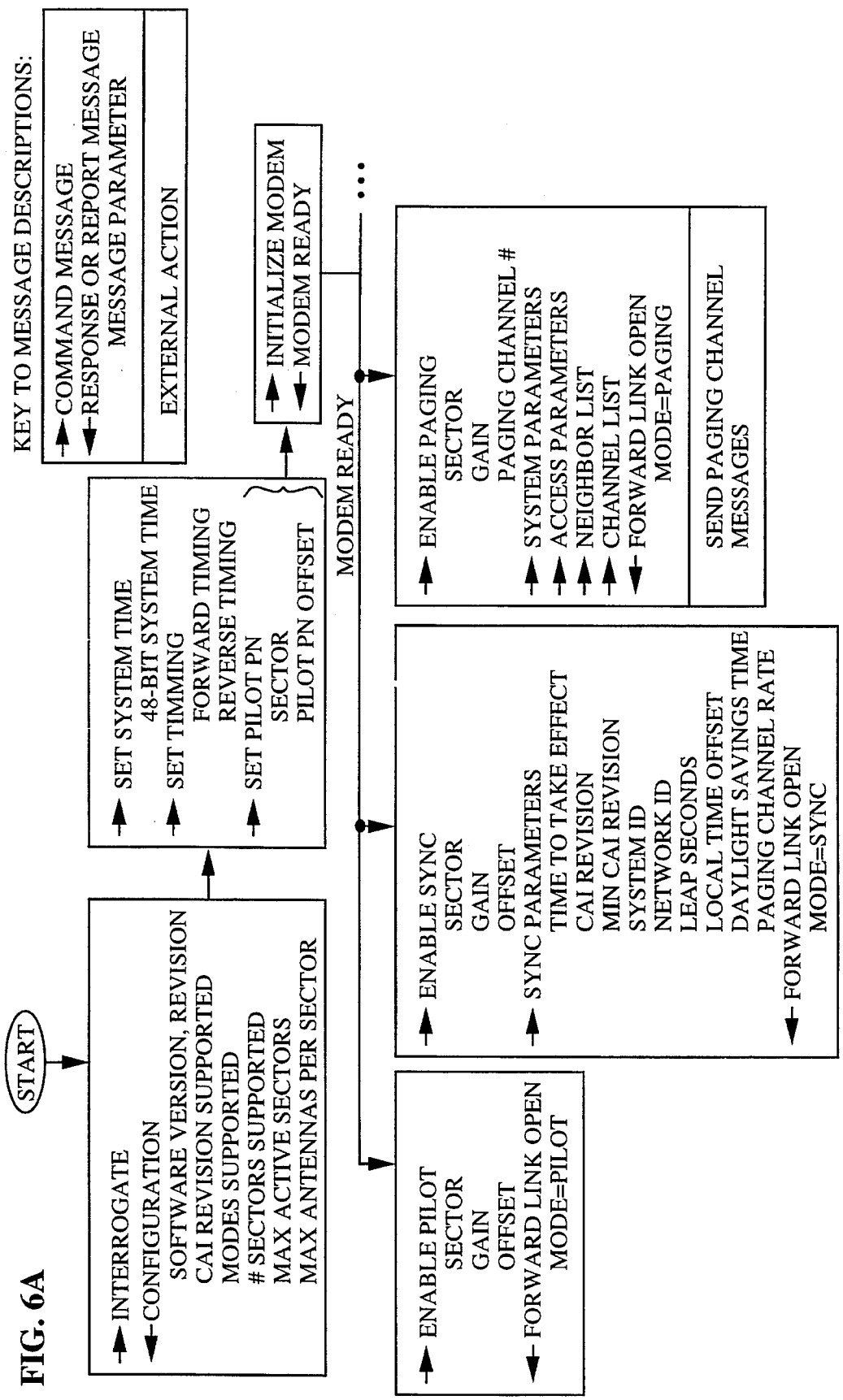
FIGS. 6A and 6B are flow diagrams illustrating the exchange of commands and responses in the layered element.
Figure 6B:
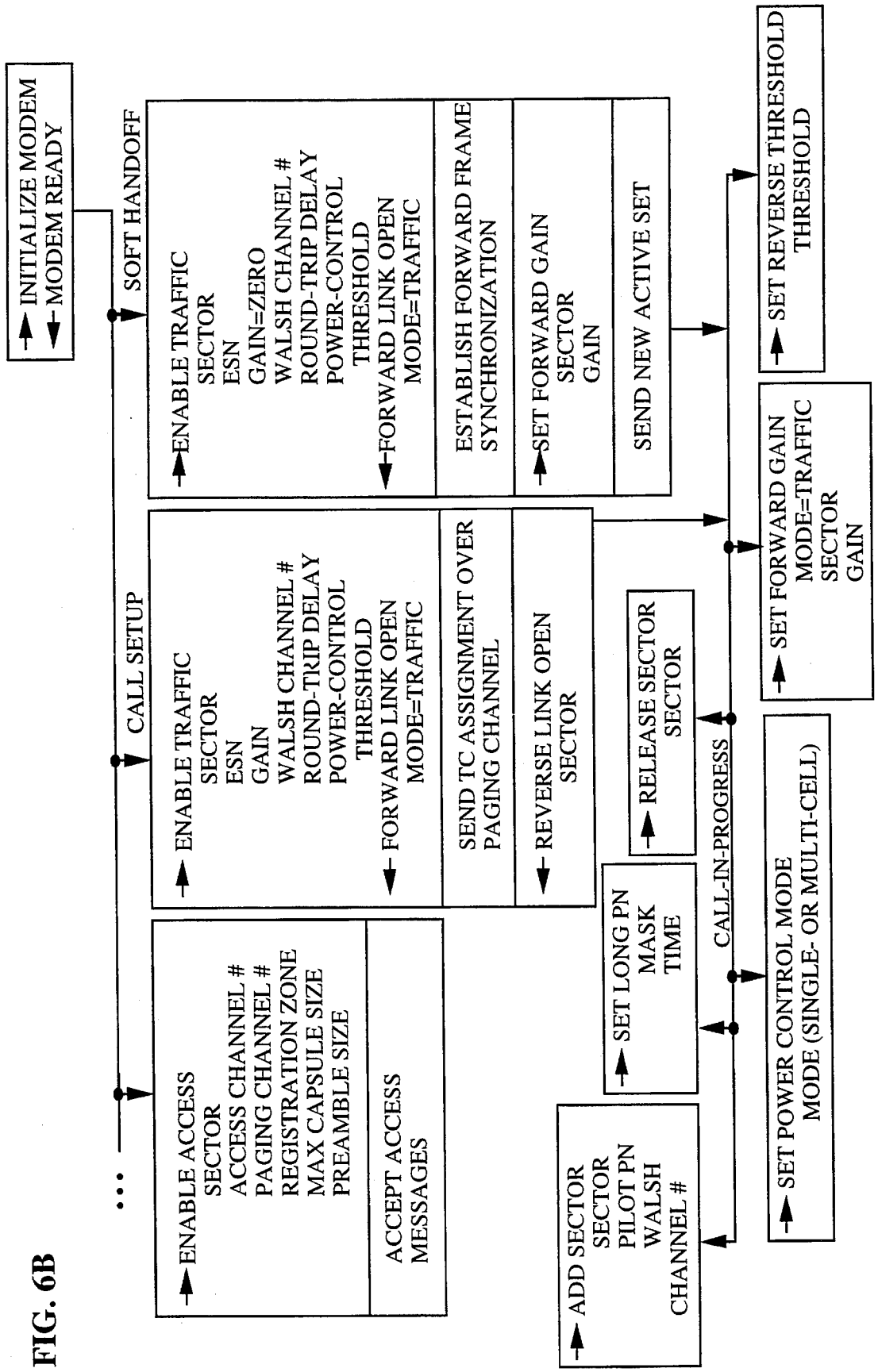

The reporting message path 212 is used by the modem 59 to autonomously inform the control element 44 of both normal and abnormal events within the modem 59. Preferably, command, response, and reporting messages are collectively referred to as control messages. The principal control messages are illustrated in FIGS. 6A and 6B. In FIGS. 6A and 6B command messages delivered over message path 210 to the layered element 200 are indicated by right-directed arrows while response or report messages that move over the message paths 211 and 212, respectively, are indicated by left-directed arrows. In FIG. 6A and 6B, there is a distinction between response messages and reporting messages. A single response message is always issued by the layered element 200 on the message path 211 as an immediate response to each command message. On the other hand, any number of reporting message may be issued by the layered element 200 over the message path 212, depending on current activity.

The forward and reverse data paths 213 and 214 carry formatted message and signaling data in packetized message format.

The message-passing functionality that supports communications between the control element 44 and the layered element 200 is conventional. In the preferred embodiment, the layered element 200 provides all queues and buffers required for communications including the command queue 220, the response queue 221, the report queue 222, the forward message and signaling data queue 223, and the reverse message and signaling data queue 224.

The layered element 200 includes an application layer 204 comprising a plurality of independent applications that are compiled separately as units. These applications include forward applications 240 and reverse applications 242. While maintaining their functional independence, these applications share support modules in the form of drivers in the device driver layer 206. The applications in the application layer 204 are tied together by the controller interface layer 202 which includes a control interface module 227 and the queues 220, 221, 222, 223, and 224 which serve message paths 210, 211, 212, 213, and 214, respectively.

The layered element 200 includes a number of compile-time parameters that are dependent upon the specific implementation of the CDMA modem processor 60 and the configuration of the CDMA modem ASIC 62. The parameters include, but are not necessarily limited to, the number of fingers, the base address of the CDMA modem ASIC 62, DMA allocations for the ASIC modulator section and for the demodulator section decoder, and external interrupt allocations for system timing, and interrupt priorities.

Upon power-up, the layered element 200 transitions through preinitialization, preconfiguration, and ready states. In the preinitialization state, the layered element 200 is powered up and is not ready to receive commands from the control element 44. In this state, the control element 44 performs initialization procedures that may be required. These procedures include at least layered element initialization causing the layered element 200 to set up required tasks, queues, and buffers to enable communications between the modem 59 and the control element 44. The control element 44 declares message handling information for each of the message paths 210, 211, 212, 213, and 214 to enable the layered element 200 to post messages. Once all initialization requirements have been satisfied, the layered element 200 transitions to a preconfigure state, reporting "Modem Interface Ready".

In the preconfiguration state, the layered element 200 is able to receive and respond to commands from the control element 44. The control element 44 begins with an "Interrogate" command, in response to which the layered element 200 provides a message on message path 211 containing configuration information. The control element 44 then issues commands for system timing. If no pilot code channel has been specified, channel element 44 may issue a "Set Pilot PN" command containing the pilot offset for the base station. Last, the control element 44 issues an "Initialize Modem" command which causes the layered element 200 to initialize the CDMA modem ASIC 62 to an idle condition, to transition to a Ready state, and to issue a "Ready" report message.

In the Ready state, the layered software element 200 is prepared to execute valid commands issued by the control element 44. Commands received in the Ready state are validated in terms of the functional capability of the loaded software configuration, and in terms of the current mode of operation.

The controller interface layer 202 of the layered software element 200 includes the control interface module 227 that forms a compilation unit in the layered software channel element. The control interface module 227 implements a control interface task, which operates conventionally to validate and process all command messages received from the control element 44. This task controls the activities of applications in the application layer 204 by calling functions provided by each application and by passing control messages to them.

A message interface module 228 is included in the controller interface layer 202 to implement the message handling functions of the layered software channel element 200 and implements and controls the queues 220, 221, 222, 223, and 224.

The control interface layer 202 provides at least five message queues which are accessible to the control element 44. The command queue 220 queues messages that include control commands and parameters. The response queue 221 carries messages signifying immediate validation or rejection of each control command, with data where appropriate. The reporting queue 222 is provided to stage status reports to the control element 44. The forward OTA data queue 223 carries forward message and signaling data and associated communications parameters. The reverse OTA data queue 224 carries reverse link message and signaling data and associated communications parameters.

The control interface module 227 extracts messages from the command queue and validates each message. The control interface module 227 essentially comprises a long switch statement implementing specific outer-layer validation and distribution rules for every identified message. Valid messages may be processed by the control interface module 227 or they may be passed to appropriate applications in the application layer 204.

The application layer 204 contains the application modules (also referred to as "applications") that control the various modes of operation of the channel element including, but necessarily limited to, pilot channel, sync channel, paging channel, forward traffic channel, reverse traffic channel, and access channel modes of operation. Preferably, in the case of a traffic channel, the forward and reverse channel modes are combined in one application. The applications in the application layer 204 are grouped into forward applications that implement pilot, sync, paging, and forward traffic modes of modem operation and into reverse applications 242 that implement reverse traffic and access modes of operation. Each application in the application layer 204 provides a conventional set of initialization, shutdown, and message-handling functions. Each application may implement one or more tasks as required. Each application in the forward and reverse applications 240 and 242 provides a standard interface to the controller interface layer 202. In this regard, all forward applications have at most three logically distinct message paths, including a bi-directional message path 243 with the control interface module 227, a uni-directional message path 224 to the report queue 222, and a uni-directional message path 245 from the forward OTA data queue 223. Each reverse application includes a bi-directional command/response message path 246 to the control interface task 227 and uni-directional message paths 247 and 248 to the report queue 222 and to the reverse OTA data queue 224, respectively.

Each of the applications in the application layer 204 is called when a valid Enable command is received by the control interface 227 in the control element 44. The Enable commands for pilot, sync, paging, access, and traffic modes are illustrated in FIG. 6A and 6B. Each application further includes a shutdown function that is called when a valid Disable Mode command is received at the control interface task 227. The Disable Mode commands essentially correspond to inverses of respective Enable commands illustrated in FIG. 6A and 6B. Thus, for example, in order to shut down a pilot mode application, the control element 44 will dispatch a Disable Pilot command. The shutdown function shuts down the application by purging data areas, flushing queues, closing open drivers, and shutting down active application tasks. Each application also includes a control message handler function that validates and processes incoming command messages received on message paths 243, 245 and 246 which are valid in terms of the implemented mode of operation. Most valid messages are simply passed to an application's control task.

The forward applications 240 include a Pilot Channel application, which operates the pilot code channel required to be transmitted on any forward CDMA channel. The Pilot Channel application is implemented entirely by its initialization and shutdown functions. Its sets up no tasks and opens no device drivers. The Pilot Channel application communicates, by way of the device interface layer 208, with the modulator section of the CDMA modem ASIC 62. The Pilot Channel application provides the pilot mode signal, the zero Walsh sequence code, the pilot offset value, and a transmitter section gain setting by way of the device interface layer 208. These values, which are registered for a transmitter section as described above in respect of FIG. 4A, are sufficient to configure a transmitter section in the modulator portion of the CDMA modem ASIC 62 to transmit the pilot signal.

Figure 7:
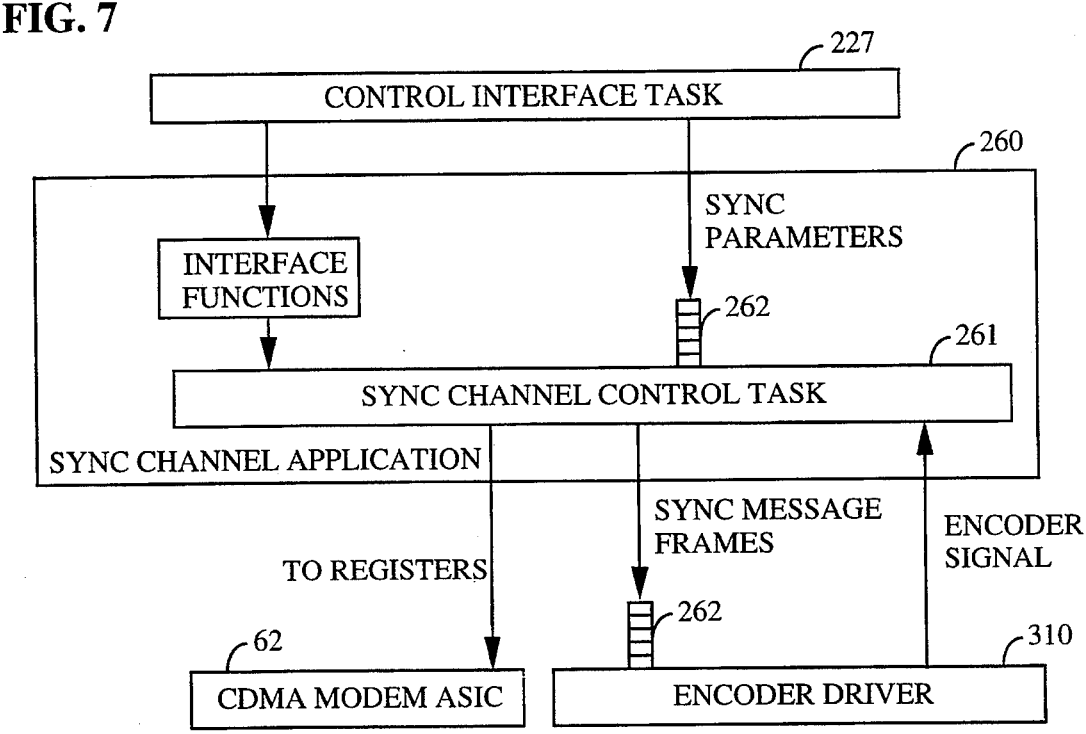
FIG. 7 is a schematic block diagram of a sync channel application.

FIG. 7 illustrates a sync channel application 260 included in the forward applications 240 of the application layer 204. The sync channel application generates a sync channel message which is transmitted on a forward CDMA code channel. The sync code channel carries a single repeating message identifying the base station and conveying system timing information to a mobile unit. The boundary between two consecutive sync channel messages also carries implicit information by serving as a precise time marker.

The sync channel application 260 is coupled by the message path 244 to the control interface 227 and is enabled by an Enable Sync command that includes a gain setting parameter and the pilot offset for the base station. The Enable Sync message is followed by a Sync Parameters message including all of the parameter values necessary to compose the sync channel message and to initialize the IMODE, long PN code, and transmit section registers in the CDMA modem ASIC for sync channel operation. The sync channel application 260 is controlled by a single task, the sync channel control task 261. The task 261 initializes the CDMA modem ASIC registers by setting the IMODE bit to indicate sync channel operation, setting the long PN code to zero, disabling the pilot mode bit, setting WS to 32, setting an offset value, and setting the gain. The task then formats the sync channel message frames based on the sync parameters received from the control interface task 227, and queues the formatted frames on an encoded driver queue in the device driver layer 206. The sync channel application 260 does not begin to transmit sync channel message frames until a Sync Parameters message is received from the control interface task 227 by way of the queue 262. Once the sync channel message has begun to transmit, the sync channel control task 261 responds to signals returned by an encoder driver in the device driver layer 206 to ensure that at least one frame is always queued for transmission. When the last frame of the sync message is sent, the sync channel control task 261 reformats and requeues the sync message frames. If a new Sync Parameters message has been received on the queue 262, the new parameters are used to formulate the sync message.

Figure 8:
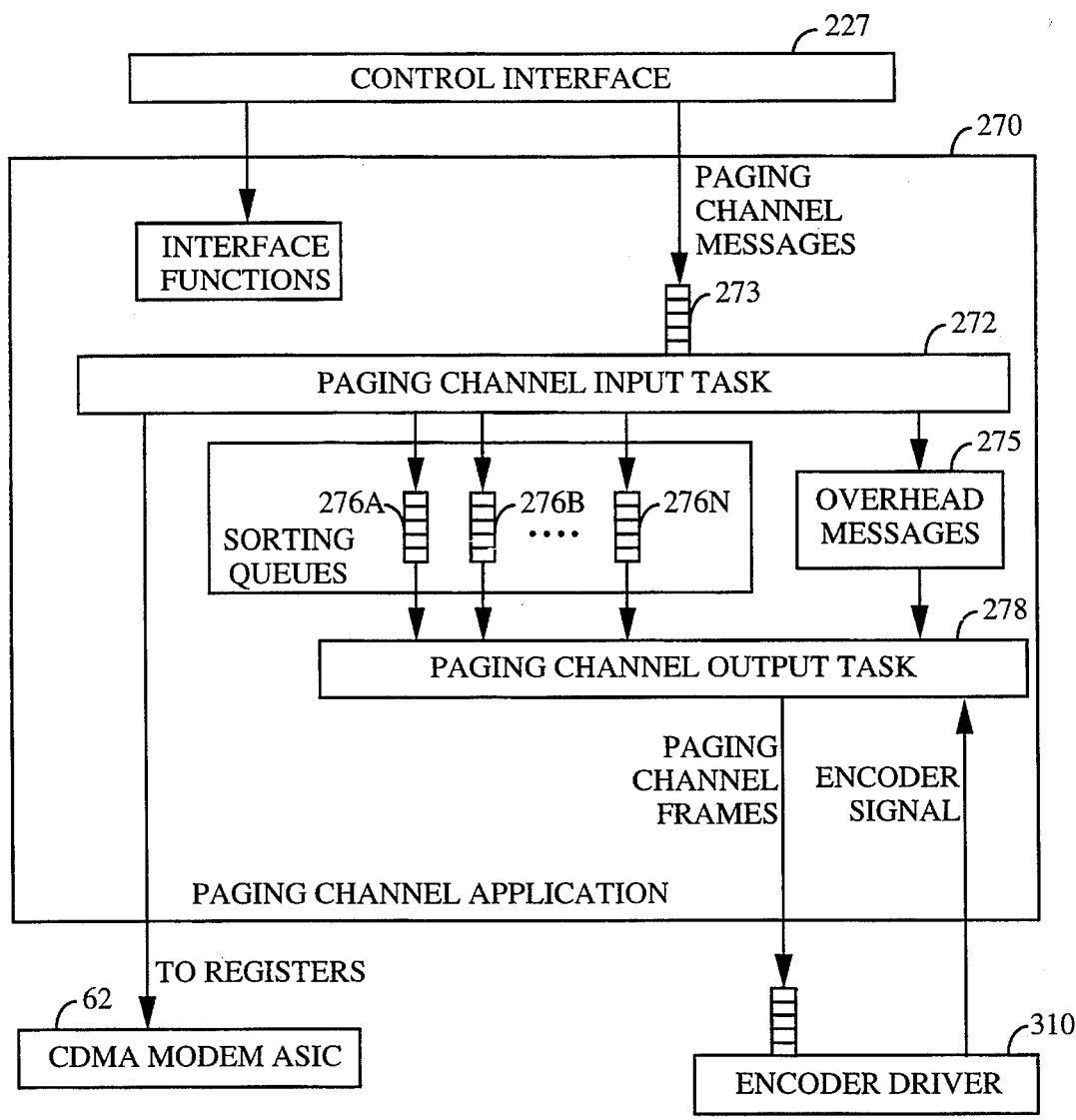
FIG. 8 is a schematic block diagram illustrating a paging channel application.

The forward applications 240 in the application layer 204 include a paging channel application which is illustrated in FIG. 8. A forward CDMA channel may have one or a plurality of paging channels. Each paging channel is used by the base station to transmit system overhead information and to send signaling data to mobile units. The paging channel sends broadcast messages to transmit system overhead information. By default, these broadcast overhead messages may be transmitted repeatedly. The broadcast overhead messages have a lower priority than mobile unit-specific traffic, except that they are required to be transmitted periodically. The paging channel application 270 includes a paging channel input task 272 that initializes the IMODE, long PN code, and transmit section registers with values received from the control interface 227. The input task 272 then accesses a paging channel message queue 273. The paging channel input task 272 accepts paging channel message commands which include overhead message commands and mobile station-specific message commands. The paging channel input task 272 transfers overhead message commands to an overhead message holding queue 275 in which the most recent version of each of the plurality of overhead messages is stored. Mobile unit-specific message commands are sorted by type; that is to say, they are appended to one of a plurality of sorting queues 276a, 276b through 276n depending on the type of message. A paging channel output task 278 uses overhead information contained in the overhead message command and mobile unit-specific commands to format paging channel frames. The paging channel output task 278 responds to a signal from an encoder driver in the device driver layer 206, which prompts it to enqueue at least one encoder frame on the encoder drive queue at all times. The paging channel output task 278 processes the sorting queues 276a–276n in sequence. Commands that specify quick repeats are requeued with a decremented quick repeat count. When the internally queued message pool in the sorting queues and the overhead message queues reaches predetermined size, the paging channel application 270 issues a report message to warn the controller element 44.

Figure 9A:
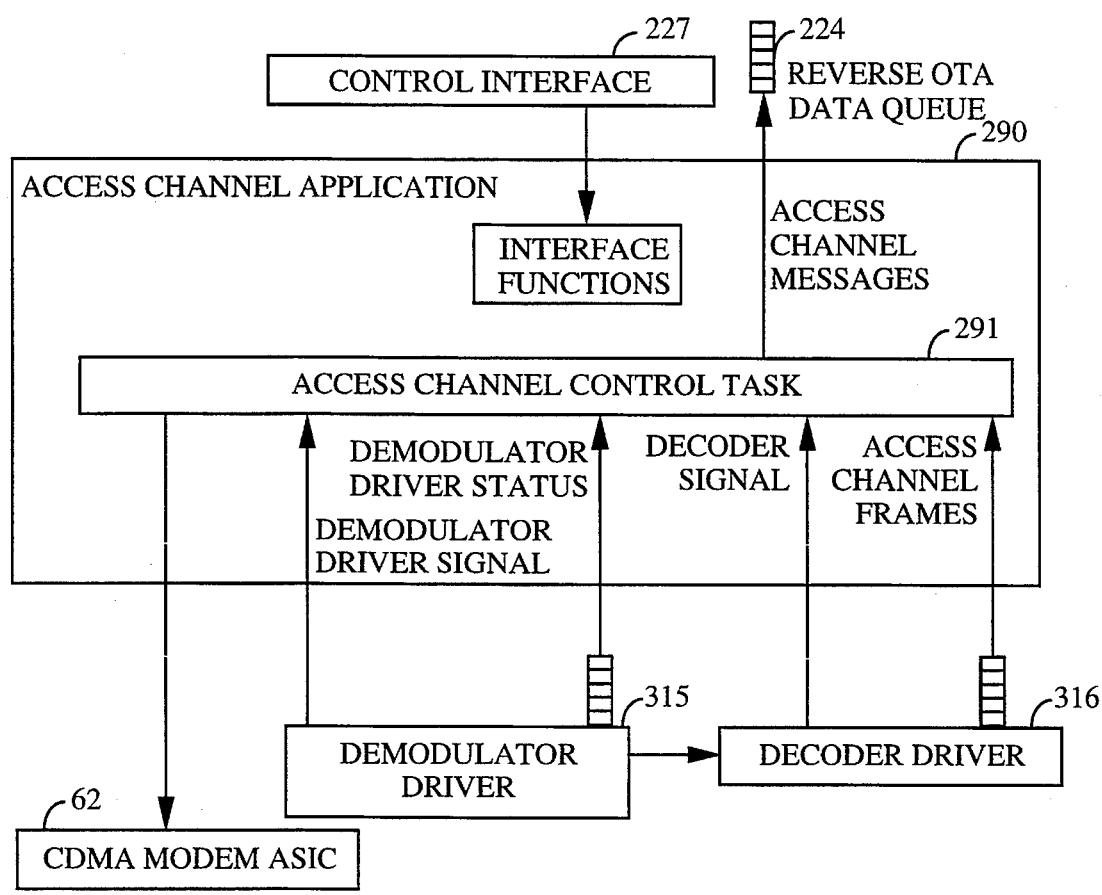
FIGS. 9A and 9B are, respectively, schematic block and flow diagrams illustrating an access channel application.
Figure 9B:
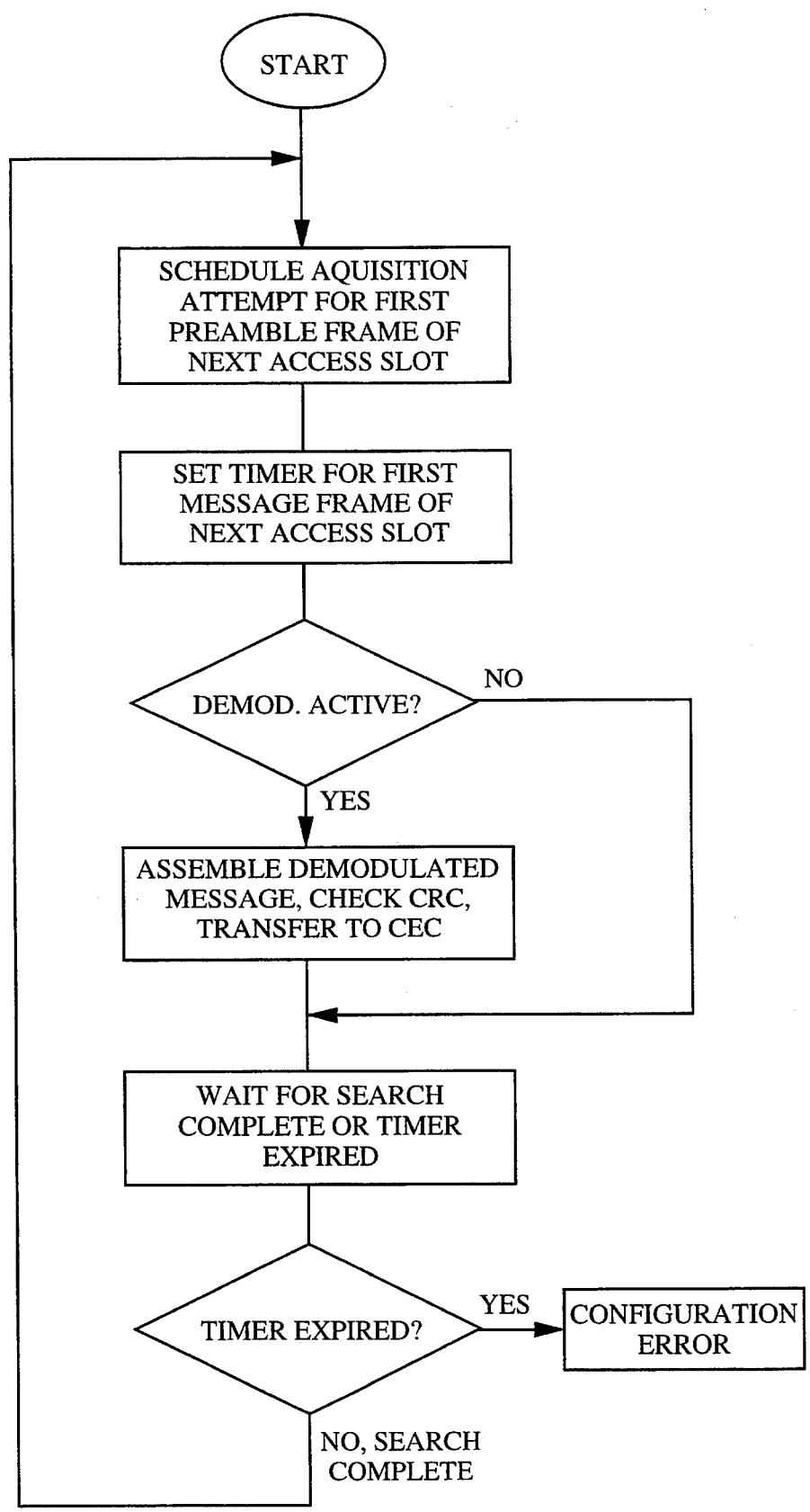

The reverse applications 242 in the application layer 204 include an access channel application illustrated in FIGS. 9A and 9B. The access channel application 290 implements the access mode of operation and includes an access channel task 291. When activated, the access channel control task 291 initializes the finger, searcher receiver, demodulator, long PN code, and decoder registers of the CDMA modem ASIC. An access code channel is used by a mobile unit to transmit messages to a base station while the mobile unit is not active on a reverse traffic code channel. An access code channel is divided in the time domain into slots, each of which is further divided into a preamble window followed by a message window. Each window is a whole number of frames in length. The access channel application 290 searches each preamble window for an access channel preamble signifying a mobile unit transmission. When it finds a preamble, the access channel control task 291 attempts to demodulate and decode the corresponding message. Valid messages are passed to the control element 44.

The access channel control task 291 is comprised of logic which is illustrated in FIG. 9B. The logic of FIG. 9B is based upon a slotted, random access architecture for an access code channel. This architecture is set forth in detail in the Proposed EIA/TIA Interim Wide Band Spread Spectrum Digital Cellular System Dual-Mode Mobile Station-Base Station Compatibility Standards published by the assignee of this application on Apr 21, 1992. Relatedly, the logic of FIG. 9B schedules an attempt to acquire a preamble frame in an access code channel slot which times from the scheduled acquisition to a first message frame of the next access slot and, if the demodulator driver 340 in the device layer 206 is active, assembles a demodulated message, checks cyclic redundancy correction (CRC) in the message and transfer the demodulated message to the control element 44.

The access channel employs the searcher receiver in the CDMA modem ASIC 62 in searching for mobile unit access requests. The logic of FIG. 9B enables the access channel application 290 to schedule a preamble search to start at the first frame of the next preamble window in the next access slot. Since this is the first search command, the test for demodulator active must fail, and the access channel control task 291 waits for the search scan to terminate or to time out. Assuming the search scan does not time out, the access channel control task 291 then schedules the next preamble search and, again, tests for an active demodulator. If the previous search succeeded, the demodulator would have transitioned from acquisition to multi-path access message demodulation and the access channel application 290 will attempt to process the incoming access channel message data. At the end of a message window, even though the access channel control task 291 may still be processing the last message, the already scheduled next preamble search will begin. When the previous message processing has completed, or immediately, if the preamble search has failed, the access channel control task 291 waits for the next search scan to terminate, and the cycle repeats. If the search scan ever times out, a configuration error will have occurred in that the configuration requires a search too long to be completed in the preamble window and still allow time for demodulation to commence on or before a first symbol in the message window. The demodulator driver in the device driver layer 206 allows the configuration timing to be tested, even though an access peak may not have been detected by the searcher receiver.

Relatedly, during a search, the access application specifies the search parameters including the long PN code for the channel, the search window parameters and calls drivers discussed below, to implement the search. These drivers are in the device driver layer 206. During a search, the drivers return search results. The results are formatted by the access application and passed to the control element 44 for evaluation and action.

Figure 10:
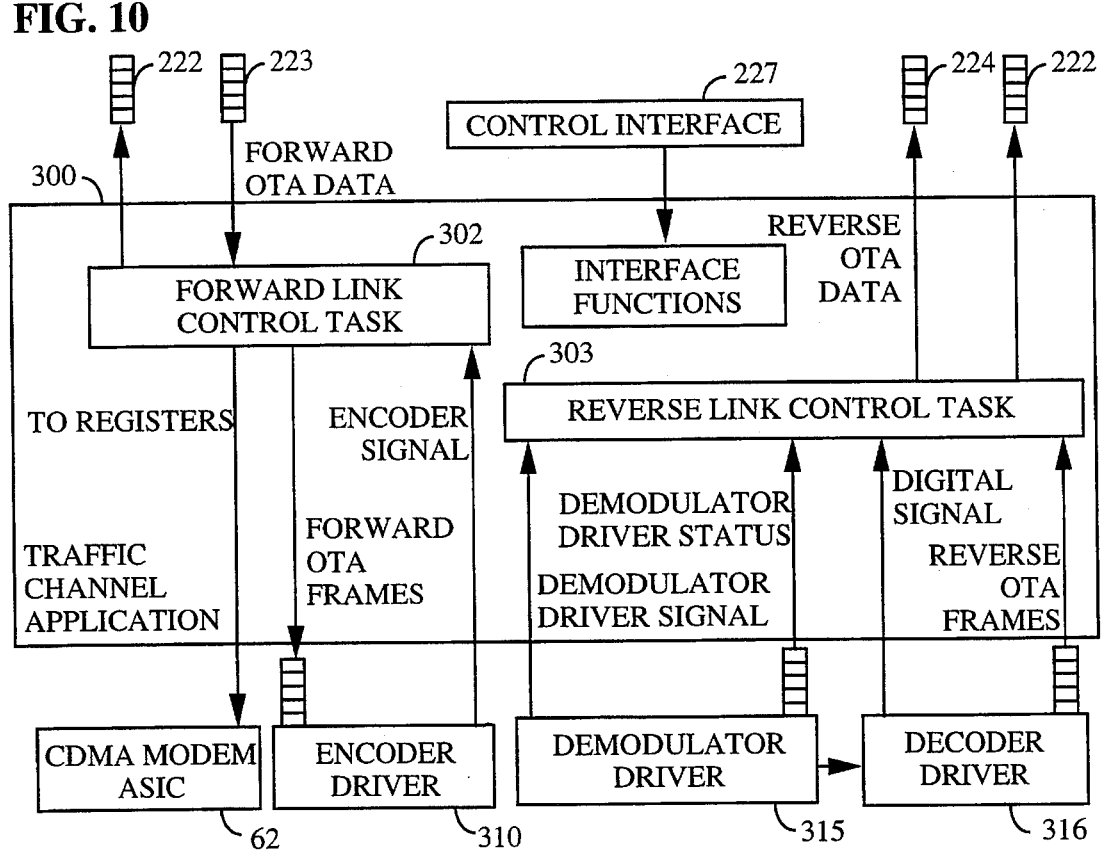
FIG. 10 is a schematic block diagram illustrating a traffic channel application.

A bi-directional traffic channel application comprising forward and reverse application components is used by a base station and a mobile unit to transfer message data continuously between the two stations over the course of a session or a "call". The traffic channel application 300 illustrated in FIG. 10 implements both the forward and the reverse links of a traffic code channel. Traffic message data is transferred in a variety of data formats and the traffic channel application 300 makes no attempt to parse the message data transferred in either the forward or the reverse direction. Preferably, message data is transferred on a traffic code channel in a variety of data rates. In the forward direction, the control element 44 associates a data rate with each message data frame. In the reverse direction, the traffic channel application 300 transfers all message data received from a decoder driver in the device driver layer 206 and frame quality information to the control element 44. The traffic channel application 300 makes no attempt to determine the reverse channel frame rate.

The traffic channel application 300 is implemented in a forward link control task 302 and a reverse link control task 303. The forward link control task 302 initializes the CDMA modem ASIC registers with data rate, IMODE, long PN code, and transmit section register values. The task 302 then transfers forward message data frames from the forward OTA data queue 223 to an encoder driver queue in the device driver layer 206. The forward link control task 302 responds to an encoder driver in the device driver layer 206 to ensure that at least one frame is always queued. When the first frame is transmitted, the forward link control task 302 sends a "Forward Link Open" report message via the report message queue 222. In the absence of forward message data from the controller element 44, the forward link control task 302 instructs the encoder driver in the device driver layer 206 to transmit either a null traffic frame or a corrupt frame according to a current data mode. A reverse link control task 303 in the traffic channel application 300 enters an acquisition state when the application 300 is first enabled. In this state, the task 303 commands a demodulator driver in the device driver layer 206 to attempt to acquire and demodulate the reverse traffic code channel. The command is repeated until the demodulator driver status indicates demodulation active. At this time, a "Reverse Link Open" report message is sent to the control element 44 via the report queue 222, the decoder driver is enabled, and the task 303 enters a Demodulation State. In the Demodulation State, the application 300 responds to a signal from a decoder driver in the device driver layer 206, transferring decoded message data frames and frame quality metrics to the control element 44.

The device driver layer 206 of the layered element 200 includes an encoder driver 310, a master timing module 312, a demodulator driver 315, and a decoder driver 316. The encoder driver 310 communicates over a bi-directional message path 311 with one or more forward applications 240. The encoder driver 310 interacts with the modulator section of a CDMA modem ASIC to facilitate to the transfer of forward data from an application to the encoder section modulator. The demodulator driver 315 interacts with the demodulator section of a CDMA modem ASIC to facilitate acquisition and multi-path demodulation of reverse data and transfer of code symbols to the decoder. The decoder driver 316 interacts with the decoder in the demodulator section to facilitate the transfer of decoded frames and frame quality metrics to a reverse application. The master timing module 312 receives system timing information from the system synchronization element 42 of FIG. 2 to synchronize, decimate, and distribute system timing.

Preferably, each of the drivers 310, 315, and 316 exports a set of function calls. Many of these function calls are translated into queued messages which are processed by synchronized control tasks within the drivers. Similarly, the control task in each of the drivers 310, 315 and 316 reports to an application using queued messages. The action of opening one of the device drivers 310, 315 and 316 identifies the controlling application task, starts up the device driver controlling task, and installs any associated interrupt handlers.

Figure 11:
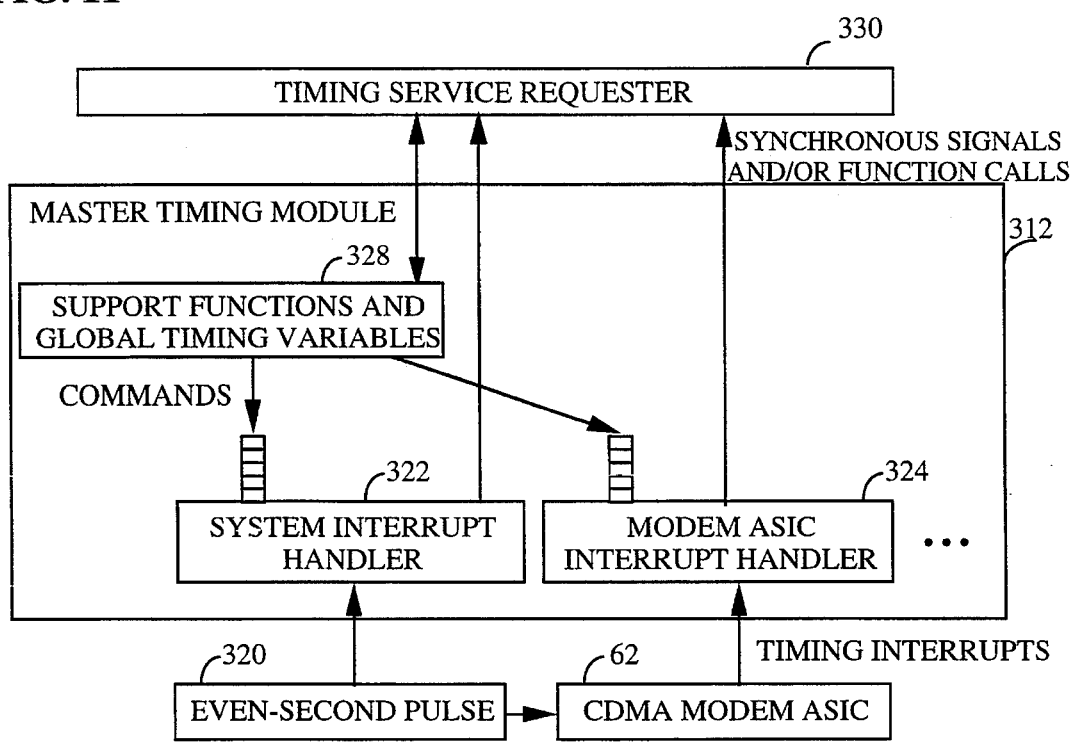
FIG. 11 is a schematic block diagram illustrating a master timing module.

The master timing module 312 is illustrated in FIG. 11. The master timing module 312 provides a mechanism for synchronizing the transmission of messages from independently-coded modules and the calling of functions with any timing interrupt. The master timing module 312 also maintains system time and provides services for converting among time formats as required. The services of the master timing module 312 are accessible to any module in the modem. The master timing module 312 receives even second pulses from a source 320 in the system synchronization element 42. The even second pulses are provided to a system interrupt handler 322 that synchronizes all timing functions and events to system time. In addition, a plurality of modem ASIC interrupt handlers, one of which is indicated by 324, are installed for handling timing interrupts from a CDMA modem ASIC. These interrupt handlers support synchronized message passing and function invocation and maintain internal and global timing variables.

Figure 12:
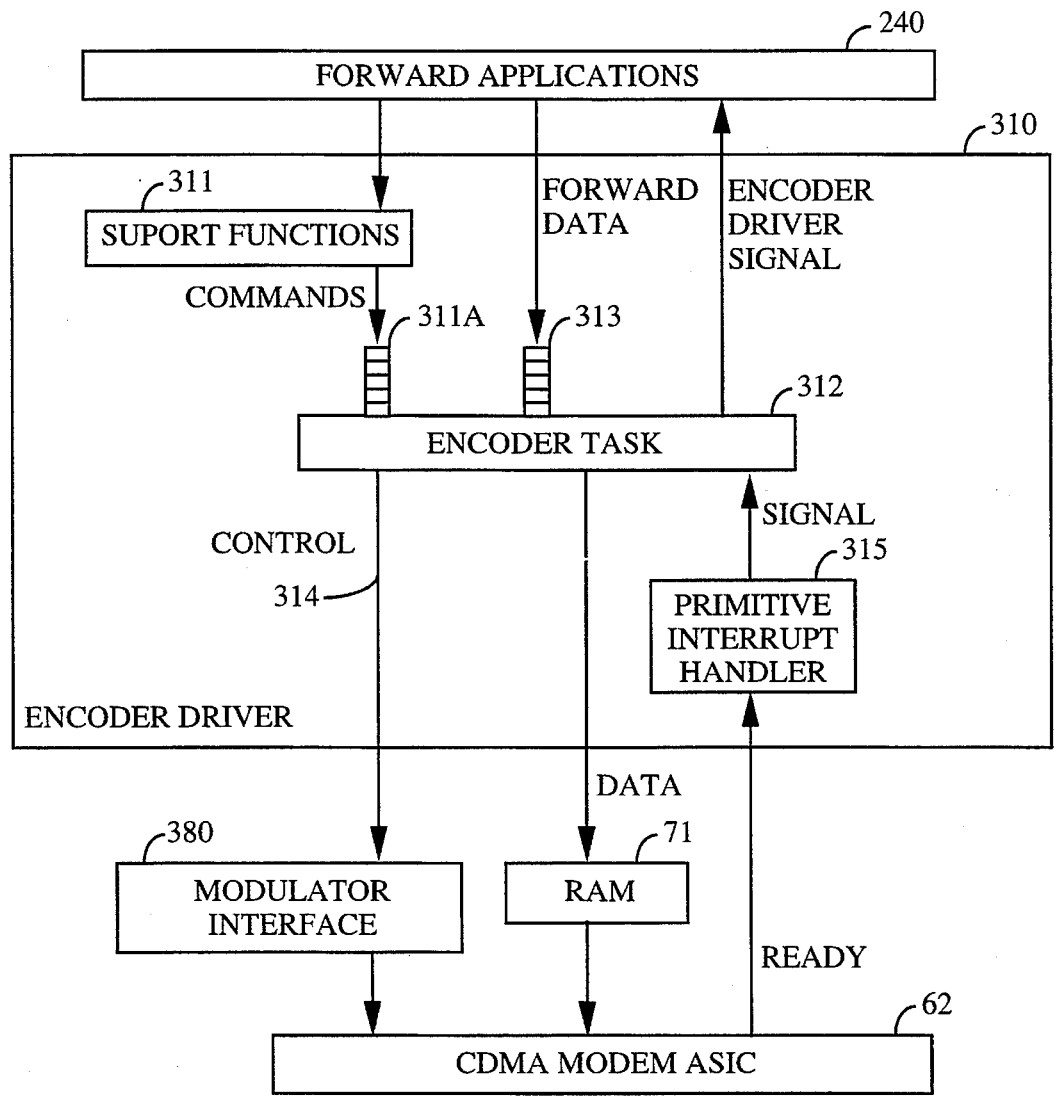
FIG. 12 is a schematic block diagram illustrating an encoder driver.

The encoder driver 310, illustrated in FIG. 12, supports the transfer of forward message and signalling data from a forward application 240 to the modulator section of a CDMA modem ASIC. The forward application controls the encoder driver 310 by calling a set of support functions 311 which execute in the task space of a calling forward application. Support functions 311 translate the application's requests into control commands which are queued 311a to an encoder task 312. The support functions 311 conventionally open and close the encoder driver 310 and queue flames of packetized signalling and message data for transmission at specified rates. The encoder task 312 receives control commands from the support functions 311, via the queue 311a, processes the commands and extracts frames of forward message and signalling data from an input queue 313 that is loaded by a sync, paging, or traffic application. In turn, the encoder task 312 sends the frames of packetized sync, message or signalling data through the device interface layer 208 to the RAM 71 in the modulator section of the CDMA modem ASIC. A primitive interrupt handler 315 installed with the encoder driver 310 receives the Ready signal from an encode and interleave circuit (reference numeral 65 in FIG. 4A) located in the modulator section of a CDMA modem ASIC. Conditioned to one state, the READY signal indicates that the encoder and interleave circuit can accept another frame of data for decoding and interleaving. The READY signal is passed via the interrupt handler 315 to the encoder task 312. In response to the READY signal, the encoder task will send the next frame of data to the RAM 71 for processing by the encode and interleave circuit.

Figure 13:
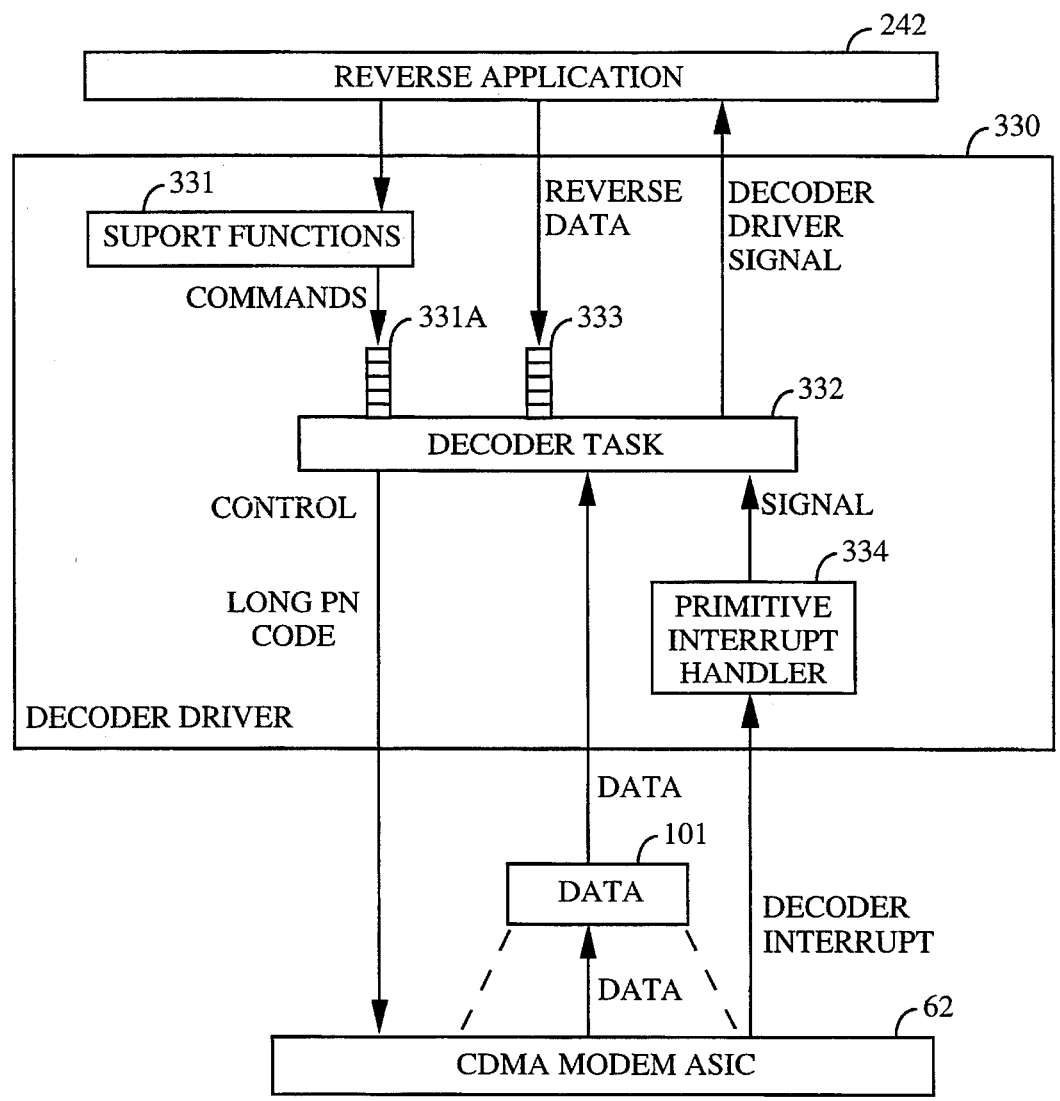
FIG. 13 is a schematic block diagram illustrating a decoder driver.

FIG. 13 illustrates the structure of a decoder driver 330. The decoder driver 330 is invoked by a reverse application 242 that calls decoder driver support functions 331. The support functions 331 translate the reverse application's requests into control commands that are enqueued at 331a to a decoder task 332. The support functions include those of opening and closing of the driver 330 and dequeing frames of reverse packetized message and signalling data that is enqueued at 333. The decoder task 332 processes the commands received from one of the reverse applications 242 on the queue 331a, queues reverse frames at 333 and signals to the calling application to synchronize the unloading of the queue 333 by the application. The decoder driver 330 installs at least one primitive interrupt handler 334 to receive the decoder status signal that serves to inform the decoder driver 330 of the presence of a frame of decoded data in the data register of the set of decoder registers in a CDMA modem ASIC.

Figure 14:
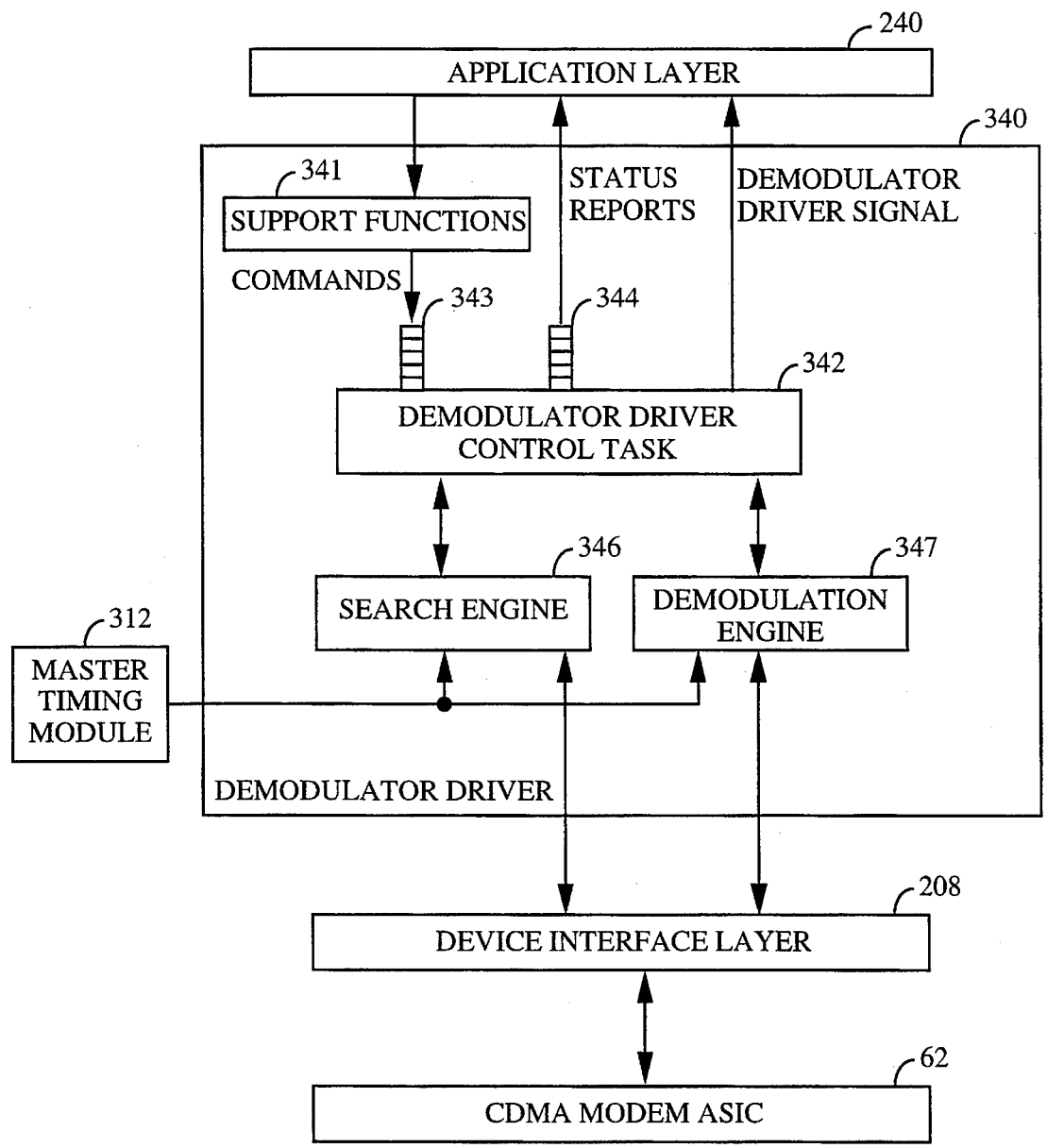
FIG. 14 is a schematic block diagram illustrating the demodulator driver.

FIG. 14 illustrates a demodulator driver 340 that controls the acquisition and multi-path demodulation of reverse message and signalling data. The demodulator driver 340 includes support functions 341, a demodulator driver control task 342 with an input queue 343 for receiving commands from the support functions 341, and an output queue 344 for providing status report of searcher receiver and finger operation. The demodulator driver 340 further includes a search engine 346 and a demodulation engine 347. The demodulator driver 340 accesses finger registers, searcher receiver registers, and the demodulator registers on a CDMA modem ASIC via the device interface layer 208.

The search engine 346 and demodulation engine 347 partition the demodulator driver 340 into independent functional components. Driven by a modem ASIC interrupt handler 324 in the master timing module 312, the two engines perform searching and demodulation, respectively, under the control of the demodulator driver control task 342.

The demodulator driver control task 342 coordinates the operation of the two engines 346 and 347 in response to commands received on the queue 343 by way of the support functions 341 from a reverse application in the application layer 240. The main functions of the demodulator driver control task 342 are to partition a search window, set and update searcher receiver parameters in searcher receiver registers, analyze searcher results in a searcher receiver results register, and assign fingers.

A reverse application in the application layer 240 controls the demodulator driver 340 by calling a set of support functions in the support functions 341. The support functions translate the application's requests into control messages which are queued to the control task at 343. The functions for the demodulator driver control task 342 are given at Table I, the parameters referenced in Table I are layered out in Table II.

TABLE I open_demodulator driver (task_p, signal)

close_demodulator driver (void)

set_long_PN_mask (long_PN_mask, timed, load_time)

configure_acquisition_search (width, resolution, integration_period)

configure_multipath_search (width, resolution, integration_period)

set_reverse_threshold (threshold)

acquire_and_demodulate (start_offset, sector, data_mode, data_rate)

search parameter (timed, start_frame)

disable_demodulation (void)

TABLE II task_p=task to signal when new status message is available.

signal=signal to use to indicate new status message is available.

long_PN_mask=new long PN mask to load at specified time or at next superframe boundary.

timed=boolean, set TRUE to indicate a timed command.

load_time=system time in superframes, modulo 65536, at which to load new mask (if timed=TRUE).

width=search scan width in one-eighth chips.

resolution=scan step size in one-eighth chips.

integration_period=number of Walsh symbols to accumulate per step.

threshold=reverse-link power control threshold.

start_offset=first scan offset in one-eighth chips.

sector=sector ID to acquire/demodulate.

data_mode=preamble (Walsh symbol zero) or traffic (variable data).

data_rate=full, half, quarter eighth or variable.

search_parameter=energy ($I^2+Q^2$) or estimated magnitude of (I,Q).

start_frame=system time in frames, modulo 65536, at which to start searching (if timed=TRUE).

The acquire_and_demodulate function initiates a single acquisition attempt that causes the demodulator driver 340 to perform a single scan of a specified search window. If a signal peak is found, the demodulator driver automatically transitions to multi-path demodulation and signals the calling reverse application in the application layer 240 via the status report queue 344 that demodulation has commenced. During multi-path demodulation, the demodulator driver control task 342 reports finger lock status and search path status to the reverse application in the application layer 240.

Figure 15:
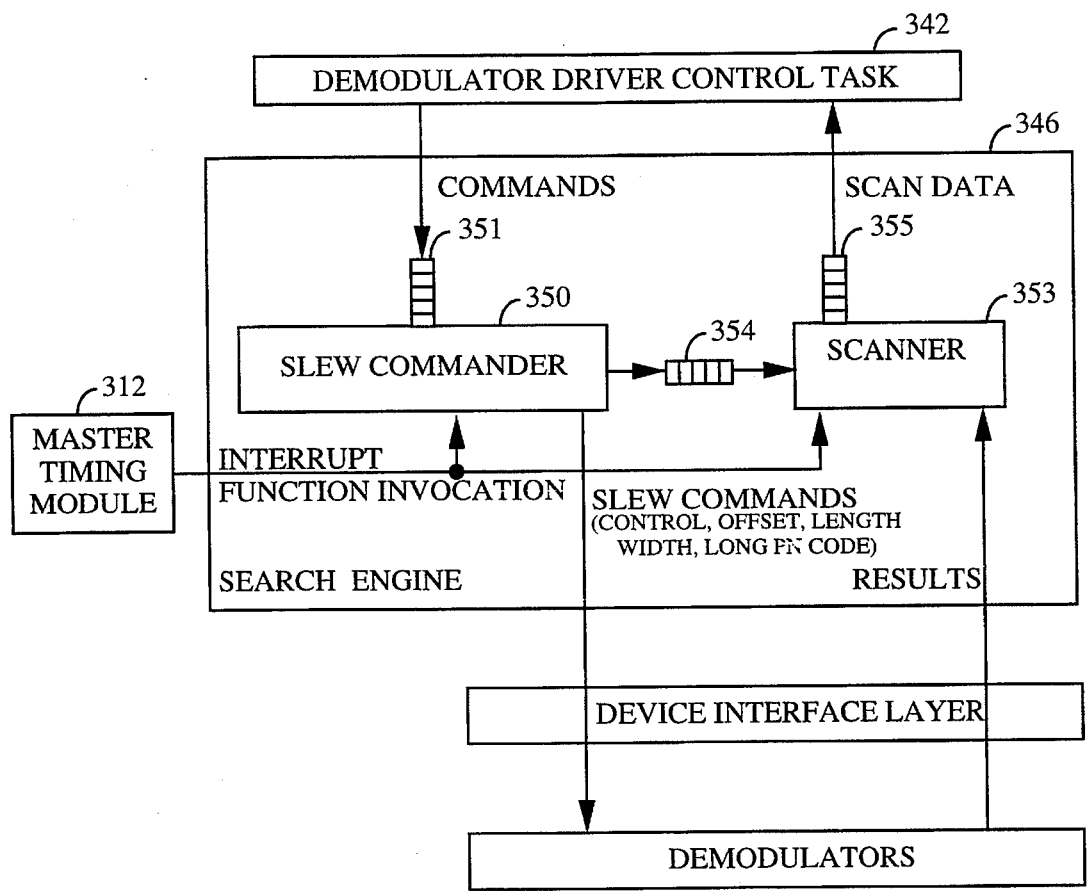
FIG. 15 is a schematic block diagram illustrating the search engine.

The search engine 346 of the demodulator driver is shown in more detail in FIG. 15. The search engine supports preamble and multi-path searches by stepping a searcher receiver through its assigned search windows and by extracting and integrating the searcher receiver results. The search engine is preferably implemented as a state machine driven by the modem ASIC interrupt handler 24 in the master timing module 312 (illustrated in FIG. 11).

While the search engine 346 is idle, the demodulator driver control task 342 sets up a search by assigning the searcher receiver to scan according to specified parameters and to accumulate the scan results placed in the results register of the searcher receiver registers. The demodulator driver control task 342 then initiates a scan by sending a "start-scan" command message to the slew commander 350 through an input queue 351. The scan start may be unsynchronized or may be synchronized by way of the interrupt function invocation output by the master timing module 312. The slew commander 350 responds to search commands input through the queue 351 by updating the search window parameters in the searcher receiver registers. Effectively, this enables the slew commander 350 to slew the searcher receiver to a specified offset and to initiate a scan at that offset. During a scan, the slew commander 350 walks the searcher receiver through its assigned range of offsets, stopping at each offset for the duration of the number of symbols over which results are to be integrated.

A fixed length queue 354, whose length is equal to the delay encountered while processing search results is set by the search commander 350. Referring to FIG. 4B, this delay comprises the signal path from 92 through 88, over 94, and through 92 to the results register. The queue 354 is essentially a tag FIFO, each stage of which contains an entry for a search window. The search engine 346 also includes a scanner 353 that receives the output of the queue 354, interrupt function invocation from the master timing module 312, and search results from the results register of the searcher receiver registers. When the scanner 354 receives a tag from the queue 354, it extracts the contents of the results register and integrates the contents into results for the current scan. When a scan is ended, the slew commander 350 places an end scan flag in the buffer queue 354. When the scanner 353 receives the end scan flag, it queues the results for the current scan at 355 for delivery to the demodulator driver control paths 342.

Figure 16:
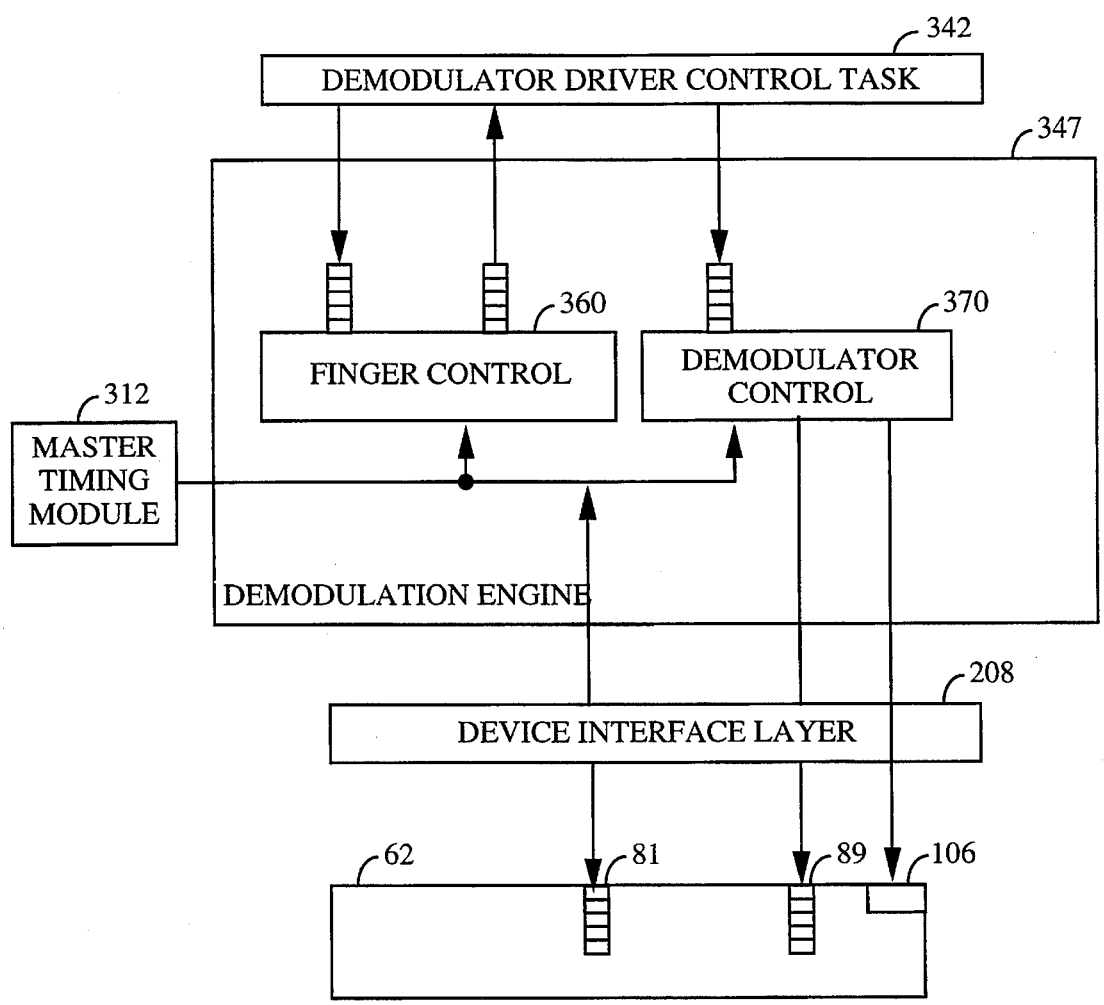
FIG. 16 is a schematic block diagram illustrating a demodulation engine.

The demodulation engine 347 supports multi-path demodulation for both access and traffic channels. The demodulation engine 347 operates on CDMA modem ASIC fingers assigned to produce combined information for demodulation by the demodulator in a CDMA modem ASIC. The demodulator driver control task 342 coordinates the demodulation process by sending finger assignment commands to finger control module 360. The finger control module translates these commands into finger operation parameter values that are input into the finger offset and finger enable registers of an assigned finger. One set of such registers is indicated by reference numeral 81 in FIG. 16; this corresponds to the identically-numbered set of finger registers in FIG. 4B. The finger control module 360 also reads the finger energy and finger position registers for the assigned finger for recording finger operation results to the demodulator driver control task 342. The demodulation engine 347 also includes a demodulator control module 370 that receives commands from the demodulator driver control task 342. These commands are translated by the demodulator control module 370 into the demodulator control parameters that are input to the demodulator registers 89 on the CDMA ASIC and into the long PN code mark that is entered into register 106 in the CDMA ASIC.

Figure 17:
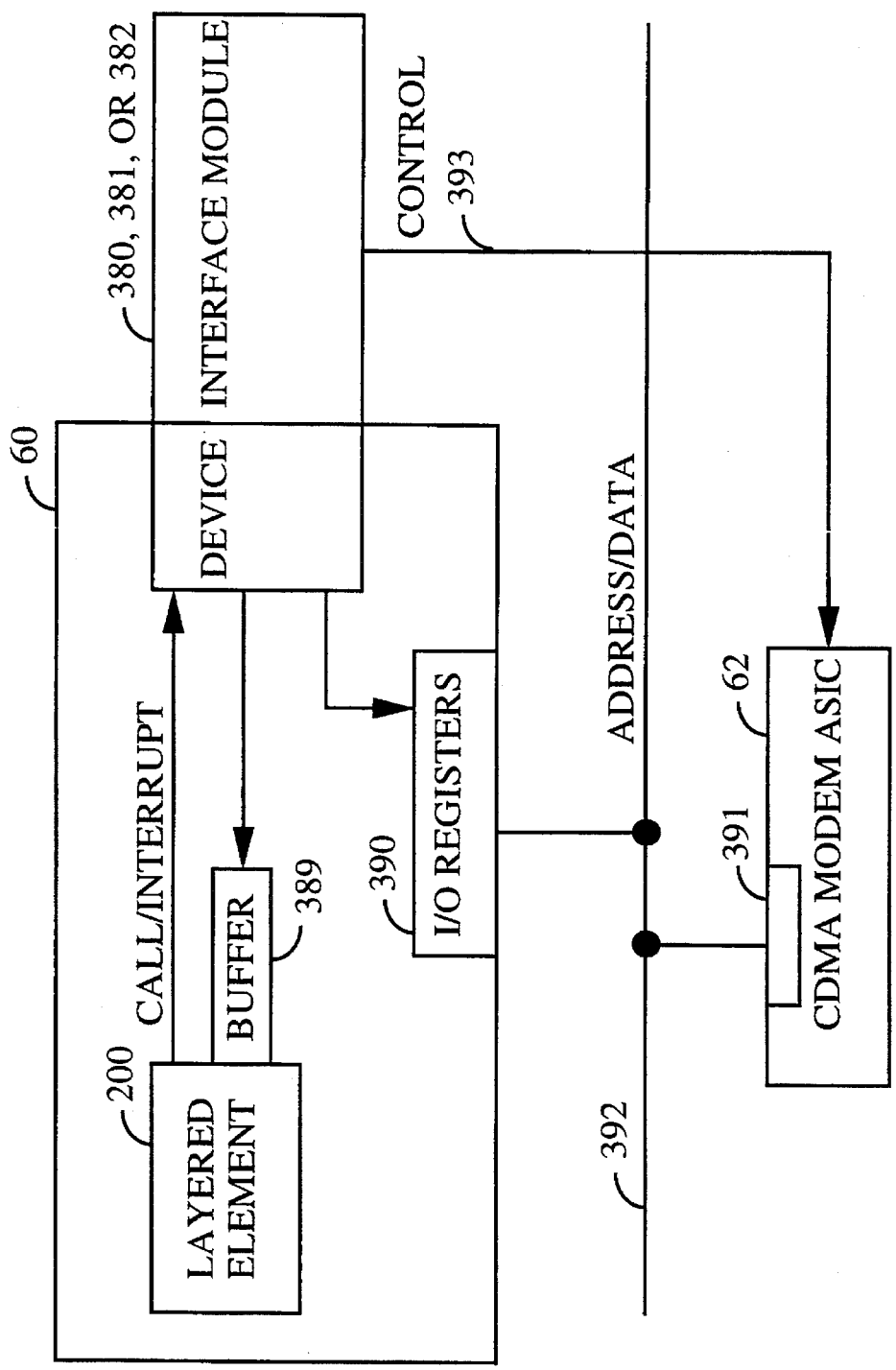
FIG. 17 is a schematic block diagram illustrating the interface between the layered element and a CDMA modem ASIC.
Figure 18:
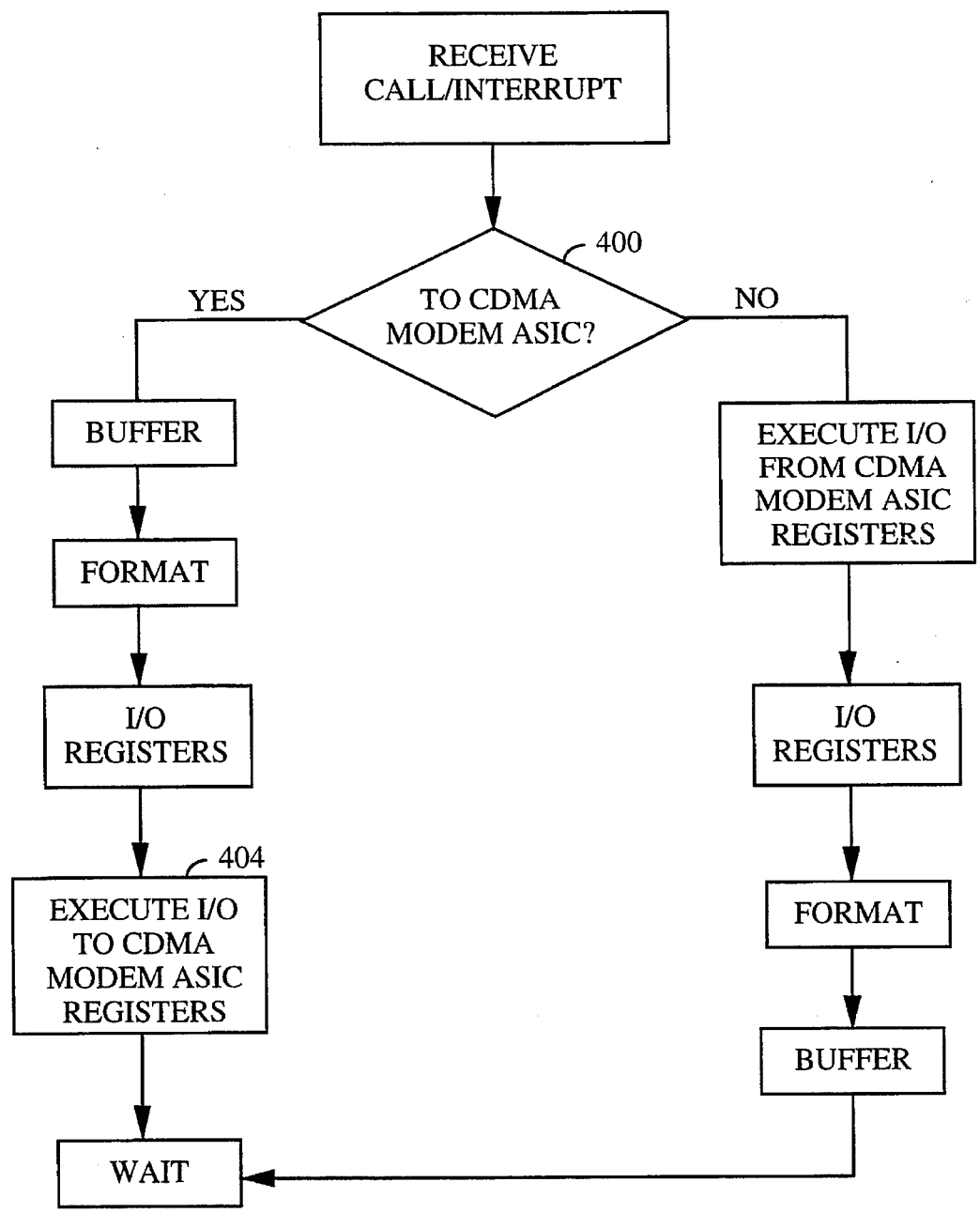
FIG. 18 is a flow diagram illustrating the logic of a device interface module shown in FIG. 17.

Refer now to FIGS. 5, 17 and 18 for an understanding of the device interface layer 208 that presents a physical level of abstraction of the CDMA modem ASICs. The device interface layer includes three modules: a modulator interface module 380, a demodulator interface module 381, and a decoder interface module 382. The modulator interface module 380 is provided for transferring data between the layered element 200 and the memory and registers in the modulator section of a CDMA modem ASIC. Relatedly, the memory and registers in the modulator section of the CDMA modem ASIC have been explained with reference to FIG. 4A. The demodulator interface module 381 handles the transfer of data between the layered element 200 and CDMA modem ASIC demodulator section registers that effect demodulation. These registers correspond essentially to the finger registers, the searcher receiver registers, the demodulator registers, and the long PN code register explained previously with reference FIG. 4B. A decoder interface module 382 handles the transfer of data between CDMA modem ASIC decoder registers and the layered element 200. The decoder registers correspond to the registers indicated by reference numeral 101 and explained with reference to FIG. 4B.

Each device interface module includes a set of functions and macros that support a consistent interface between the layered element 200 and a CDMA modem ASIC. The device interface modules perform the specific control functions and make the specific signal connections necessary to transfer data between a general purpose CDMA modem processor and a CDMA modem ASIC. In this regard, they are the only functions that are processor-specific. When called by a layered element process, a device interface layer module executes in the process space of the calling process that is provided conventionally by the CDMA modem processor in which the layered element executes.

Within each device interface layer module, there is a one-to-one relationship between the macros and functions which make up the module and CDMA modem ASIC registers, register groups, or memory.

As shown in FIG. 17, a calling process in the layered element 200 invokes a function or macro in one of the device interface modules 380, 381, or 382 by a conventional call procedure. With the call, the layered element calling process designates a buffer 389 where data is to be picked up or delivered. With the call and the buffer designation, the device interface module 380, 381 or 382 uses the I/O facilities of the CDMA modem processor operating system including pre-designated I/O registers 390 to transfer data to or from CDMA modem ASIC registers which are indicated in FIG. 17 by reference numeral 391. The registers 391 may comprise any of the register sets or memories previously described with reference to FIG. 4A and 4B. Using the I/O facilities of the CDMA modem processor operating system, a conventional data bus 392 with address and data lines, and a conventional control interface 393, the device interface module 380, 381, or 382 operates within a CDMA modem processor as illustrated in FIG. 18 to transfer data between the layered element 200 and the CDMA modem ASIC 62.

In FIG. 18, the device interface module 380, 381 or 382 receives a call from a process on the layered element 200. Initially, the device interface module 380, 381 or 382 determines whether the call or interrupt was for the purpose of transferring data to a CDMA modem ASIC. If so, the device interface module 380, 381 or 382 takes a positive exit from the decision 400 accesses the data in the data buffer designated by the calling process, formats the data, as required, by such functions as data range-checking, bit-masking, and bit-shifting. The formatted data is transferred to the I/O registers 390 and, in Step 404, the I/O facility of the CDMA modem processor operating system is invoked to transfer the data from the I/O registers to the appropriate CDMA modem ASIC registers. This process is essentially reversed for transfer of data from the CDMA modem ASIC when a negative exit is taken from the decision 400. In this case, the I/O facilities are invoked to obtain data from designated CDMA modem ASIC registers and the data is transferred to the I/O registers 390, formatted, and delivered to the designated buffer location.

The device interface layer 208 serves the purpose of insulating the layered element 200 from most processor-specific dependencies, such as specific addresses of CDMA modem ASIC registers. For certain calling processes, in the controller interface layer 202 and the application layer 204, the device interface layer modules may be directly accessible. For example, the pilot application in the forward applications 240 does not require access to encoder registers for pilot channel operations. For the preferred embodiment, the pilot application simply called the modulator interface module 380 to load designated transmit section register sets as required by pilot channel operation.

While I have described several preferred embodiments of my invention, it should be understood that modifications and adaptations thereof will occur to persons skilled in the art. Therefore, the protection afforded the invention should only be limited in accordance with the scope of the following claims.

I claim:

1. A method of connecting a telecommunication network to a telecommunication system, the telecommunication system including:

a plurality of telecommunication facilities for distributing forward message and signaling data from the telecommunication network to telecommunication system users and for directing reverse message and signaling data from telecommunication system users to the telecommunication network;

a control means for switching message and signaling data between the telecommunication network and the plurality of telecommunication facilities;

a plurality of independent, not necessarily uniform, general processors to run respective modem programs for receiving and transferring forward message and signaling data and for receiving and transferring reverse message and signaling data; and a plurality of modem apparatuses for modulating forward message and signaling data for distribution to telecommunication system users and for demodulating reverse message and signaling data for provision to the telecommunication network;

wherein, each telecommunication facility includes:

one or more general processors, each general processor of the one or more general processors coupled to the control means;

one or more modem apparatuses; and one or more interfaces, each interface connecting a respective general processor of the one or more general processors with a respective modem apparatus of the one or more modem apparatuses and including signal connections and control functions that are specific to the respective general processor of the one or more general processors;

the method including the steps of:

running a modem program in a general processor to receive and transfer forward message and signaling data and to receive and transfer reverse message and signaling data;

issuing messages from the modem program to the control means to provide reverse message and signaling data;

receiving messages from the control means that include forward message and signaling data;

formatting the forward message and signaling data; and the respective modem program calling interface control functions to provide forward message and signaling data to, and receive reverse message and signaling data from, signal connections of a respective interface that connects the general processor with the modem apparatus.

2. The method of claim 1, wherein the modem program includes:

pilot channel means for generating a pilot code sequence;

synchronization channel means for generating a repeating synchronization message;

paging channel means for receiving forward signaling data from the control means;

traffic channel means for receiving forward message data from the control means; and driver means for coupling the pilot channel means, synchronization channel means, paging channel means, and traffic channel means to the respective interface;

the step of running a modem program including:

operating one or more of the pilot channel means, the synchronization channel means, and the paging channel means; or operating the traffic channel means; and coupling the pilot code sequence, the synchronization message, and forward signaling data, or forward message data to the respective interface.

3. The method of claim 1, wherein the modem program includes:

access channel means for receiving reverse signaling data from the respective interface;

traffic channel means for receiving reverse message data from the respective interface; and driver means for coupling the access channel means and the traffic channel means to the respective interface;

the step of running a modem program including:

operating the access channel means; or operating the traffic channel means; and coupling reverse signaling data to the access channel means or coupling reverse message data to the traffic channel means.

4. The method of claim 2, wherein the modem program further includes:

access channel means for receiving reverse signaling data from the respective interface;

and, wherein:

the traffic channel means is further for receiving reverse message data from the respective interface; and the driver means is further for coupling reverse signaling data from the respective interface to the access channel means and for coupling reverse message data from the respective interface to the traffic channel means;

the step of running a modem program including:

operating the pilot channel means and synchronization channel means; and coupling the pilot code sequence and the synchronization message to the respective interface.

5. The method of claim 2, wherein the modem program further includes:

access channel means for receiving reverse signalling data from the respective interface;

and, wherein:

the traffic channel means is further for receiving reverse message data from the respective interface; and, the driver means is further for coupling reverse signalling data from the respective interface to the access channel means and for coupling reverse message data from the respective interface to the traffic channel means;

the step of running a modem program including:

operating the pilot channel means and paging channel means; and coupling the pilot code sequence and forward signalling data to the respective interface.

6. The method of claim 2, wherein the modem program further includes:

access channel means for receiving reverse signalling data from the respective interface;

and, wherein:

the traffic channel means is further for receiving reverse message data from the respective interface; and the driver means is further for coupling reverse signalling data from the respective interface to the access channel means and for coupling reverse message data from the respective interface to the traffic channel means;

the step of running a modem program including:

operating the access channel means and coupling reverse signalling data from the respective interface to the access channel means.

7. The method of claim 2, wherein the modem program further includes:

access channel means for receiving reverse signalling data from the respective interface;

and, wherein:

the traffic channel means is further for receiving reverse data message from the respective interface; and the driver means is further for coupling reverse signalling data from the respective interface to the access channel means and for coupling reverse message data from the respective interface to the traffic channel means;

the step of running the modem program including:

operating the traffic channel means;

coupling forward message data from the traffic channel to the respective interface; and of coupling reverse message data from the respective interface to the traffic channel means.

8. The method of claim 1, wherein the modem program includes:

traffic channel means for receiving forward message data from the control means and for receiving reverse message data from the respective interface; and driver means for coupling the traffic channel means to the respective interface;

the step of running a modem program including:

operating the traffic channel means;

coupling forward message data from the traffic channel means to the respective interface; and coupling reverse message data from the respective interface to the traffic channel means.

9. The method of claim 1, wherein the modem program includes:

pilot channel means for generating a pilot sequence; and driver means for coupling the pilot channel means to the respective interface;

the step of running a modem program including:

operating the pilot channel means; and coupling the pilot code sequence to the respective interface.

10. A telecommunications interface system, to connect:

a telecommunication network; with a telecommunication system for distributing forward message and signaling data from the telecommunication network to telecommunication system users and for directing reverse message and signaling data from telecommunication system users to the telecommunication network;

the telecommunications interface system comprising:

a control means connected to the telecommunication network and to the telecommunication system for switching message and signaling data therebetween; and a plurality of telecommunication facilities connected to the control means, each telecommunication facility including:

one or more independent but not necessarily uniform general processors to run respective modem programs for receiving forward message and signaling data and for receiving reverse message and signaling data;

one or more modem apparatuses for modulating forward message and signaling data for distribution to the telecommunication system users and for demodulating reverse message and signaling data for provision to the telecommunication network;

one or more interfaces, each interface connecting a respective general processor of the one or more general processors with a respective modem apparatus of the one or more modem apparatuses and including signal connections and control functions that are specific to the respective general processor; and each modem program executing in a general processor of the one or more general processors to receive forward message and signaling data and to receive reverse message and signaling data by:

issuing messages to the control means that include reverse message and signaling data;

receiving messages from the control means that include forward message and signaling data;

executing in its own process space the control functions of an interface to provide forward message and signaling data to the signal connections of the interface and to receive the demodulated reverse message and signaling data from the signal connections of the interface.

11. The telecommunications interface system of claim 10, wherein each modem program includes:

pilot channel means for generating a pilot code sequence;

synchronization channel means for generating a repeating synchronization message;

paging channel means for receiving forward signalling data from the control means;

traffic channel means for receiving forward message data from the control means; and driver means for coupling the pilot channel means, synchronization channel means, paging channel means, and traffic channel means to the interface.

12. The telecommunications interface system of claim 11, wherein the modem program concurrently operates the pilot channel means and the synchronization channel means, whereby the pilot code sequence and the synchronization message are coupled to the interface.

13. The telecommunications interface system of claim 11, wherein the modem program operates the pilot channel means and the paging channel means, whereby the pilot code sequence and forward signalling data are coupled to the interface.

14. The telecommunications interface system of claim 10, wherein the modem program includes:

access channel means for receiving reverse signalling data from the interface;

traffic channel means for receiving reverse message data from the interface; and driver means for coupling the access channel means or the traffic channel means to the interface;

whereby reverse signalling data is coupled to the access channel means or reverse message data is coupled to the traffic channel means.

15. The telecommunications interface system of claim 10, wherein the modem program means includes:

traffic channel means for receiving forward message data from the control means and for receiving reverse message data from the interface; and driver means for coupling the traffic channel means to the interface;

whereby forward signalling data is coupled from the traffic channel means to the interface and reverse message data is coupled from the interface to the traffic channel means.

16. The telecommunications interface system of claim 10, wherein the modem program includes:

pilot channel means for generating a pilot code sequence; and driver means for coupling the pilot channel means to the interface.

17. The telecommunications interface system of claim 10, wherein the modem program includes:

synchronization channel means for generating a repeating synchronization message; and driver means for coupling the synchronization channel means to the interface.

18. The telecommunications interface system of claim 10, wherein the modem program includes:

paging channel means for receiving signalling data from the control means; and driver means for coupling the paging channel means to the interface.

19. The telecommunications interface system of claim 10, wherein the modem program includes:

access channel means for receiving a reverse signalling data from the interface; and driver means for coupling the access channel means to the interface.

20. A telecommunications interface system, to connect:

a telecommunication network; with a telecommunication system for distributing forward message and signalling data from the telecommunication network in forward channels to telecommunication users and for directing reverse message and signalling data in reverse channels from telecommunication system users to the telecommunication network;

the telecommunications interface system comprising:

a control means connected to the telecommunication network and to the telecommunication system for switching message and signalling data therebetween, and for providing channel commands representing forward and reverse channels;

a plurality of telecommunication facilities connected to the control means, each telecommunication facility including:

one or more independent but not necessarily uniform general processors to run respective modem programs;

one or more modem apparatuses for modulating forward message and signalling data for distribution to the telecommunication system users in forward channels and for demodulating reverse message and signalling data in reverse channels for provision to the telecommunication network;

one or more interfaces, each interface connecting a respective general processor of the one or more general processors with the respective modem apparatus of the one or more modem apparatuses and including signal connections and control functions that are specific to the respective general processors; and each modem program for executing in a general processor of the one or more general processors to receive channel commands from the control means to establish forward channels and reverse channels in response to the channel commands by:

providing the channel configuration information to a respective modem apparatus coupled by a respective interface to the general processor of the one or more general processors in which the modem program executes.

21. The telecommunications interface system of claim 20, wherein each modem program includes:

pilot channel means for generating pilot channel configuration information;

synchronization channel means for generating synchronization channel configuration information;

paging channel means for generating paging channel configuration information;

traffic channel means for generating traffic channel configuration information; and driver means for coupling the pilot channel means, synchronization channel means, paging channel means, and traffic channel means to the interface.

22. The telecommunications interface system of claim 21 wherein the modem program concurrently operates the pilot channel means and the synchronization channel means, whereby the pilot channel configuration information and the synchronization channel configuration information are coupled to the interface.

23. The telecommunications interface system of claim 21, wherein the modem program operates the pilot channel means and the paging channel means, whereby the pilot channel configuration information and the paging channel configuration information are coupled to the interface.

24. The telecommunications interface system of claim 20, wherein the modem program includes:

access channel means for generating access channel configuration information;

traffic channel means for generating traffic channel configuration information;

driving means for coupling the access channel means or the traffic channel means to the interface; and whereby, access channel configuration information or traffic channel configuration information is coupled to the interface.

25. The telecommunications interface system of claim 20, wherein the modem program includes:

traffic channel means for generating traffic channel configuration information;

driver means for coupling the traffic channel configuration information to the interface; and whereby traffic channel configuration information is coupled from the traffic channel means to the interface.

26. The telecommunications interface system of claim 20, wherein the modem program includes:

pilot channel means for generating pilot channel configuration information; and driver means for coupling the pilot channel configuration information to the interface.

27. The telecommunications interface system of claim 20, wherein the modem program includes:

synchronization channel means for generating synchronization channel configuration information; and driver means for coupling the synchronization channel configuration information to the interface.

28. The telecommunications interface system of claim 20, wherein the modem program includes:

paging channel means for generating paging channel configuration information; and driver means for coupling the paging channel configuration information to the interface.

29. The telecommunications interface system of claim 20, wherein the modem program includes:

access channel means for generating access channel configuration information; and driver means for coupling the access channel configuration information to the interface.

30. A method of connecting a telecommunication network to a telecommunication system, the telecommunication system including:

a plurality of telecommunication facilities for distributing forward message and signalling data from the telecommunication network in forward channels to telecommunication user and for directing reverse message and signalling data in reverse channels from telecommunication system users to the telecommunication network;

control means for switching message and signalling data between the telecommunication network and the plurality of telecommunication facilities and for providing channel commands representing forward and reverse channels;

a plurality of independent, not necessarily uniformed, general processors to run respective modem programs; and a plurality of modem apparatuses responsive to channel configuration information for modulating forward message and signalling data for distribution to the telecommunication system users in forward channels and for demodulating reverse message and signalling data in reverse channels for provision to the telecommunication network;

wherein, each telecommunication facility includes:

one or more general processors, each general processor of the one or more general processors coupled to the control means;

one or more modem apparatuses; and one or more interfaces, each interface connecting a respective general processor of the one or more general processors with a respective modem apparatus of the one or more modem apparatuses and including signal connections and control functions that are specific to the respective general processor of the one or more general processors;

the method including the steps of:

running a modem program in a general processor to receive channel commands representing forward and reverse channels;

providing the channel configuration information to a respective modem apparatus coupled by a respective interface to the general processor of the one or more general processors in which the modem program executes.

31. The method of claim 30, wherein the modem program includes:

pilot channel means for generating pilot channel configuration information;

synchronization channel means for generating synchronization channel configuration information;

paging channel means for generating paging channels configuration information;

traffic channel means for generating traffic channel configuration information; and driver means for coupling the pilot channel means, synchronization channel means, paging channel means, and traffic channel means to the respective interface;

the step of running a modem program including:

operating one or more of the pilot channel means, the synchronization channel means, and the paging channel means; or operating the traffic channel means; and coupling the pilot channel configuration information, the synchronization channel configuration information, and paging channel configuration information; or coupling traffic channel configuration information to the respective interface.

32. The method of claim 30, wherein the modem program includes:

access channel means for generating access channel configuration information;

traffic channel means for generating traffic channel configuration information;

driver means for coupling the access channel means and the traffic channel means to the respective interface;

the step of running a modem program including:

operating the access channel means; or operating the traffic channel means; and coupling access channel configuration information or traffic channel configuration information to the respective interface.

33. The method of claim 30, wherein the modem program means includes:

traffic channel means for generating traffic channel configuration information; and driver means for coupling the traffic channel means to the respective interface;

the step of running a modem program including:

operating the traffic channel means; and coupling the traffic channel configuration information from the traffic channel means to the respective interface.

34. The method of claim 30, wherein the modem program includes:

pilot channel means for generating pilot channel configuration information; and driver means for coupling the pilot channel means to the respective interface;

the step of running a modem program including:

operating the pilot channel means; and coupling the pilot channel configuration information to the respective interface.

* * * * *